United States Patent [19]
Chelliah et al.

[11] Patent Number: 5,710,887
[45] Date of Patent: Jan. 20, 1998

[54] COMPUTER SYSTEM AND METHOD FOR ELECTRONIC COMMERCE

[75] Inventors: Raman Chelliah, San Carlos; Jason S. Cornez, Belmont; Carl Dellar, Cupertino, all of Calif.; Stephen Harrison, Cambridge, Mass.; John A. Hempe, Foster City, Calif.; Chih-Cheng Hsu, Fremont, Calif.; Eric J. Golin, Menlo Park, Calif.; Charles A. Price, San Jose, Calif.; Neal S. Rutta, Willow Glen, Calif.; Thomas A. Wood, Mountain View, Calif.; Wayne K. Yamamoto, San Francisco, Calif.

[73] Assignee: Broadvision, Los Altos, Calif.

[21] Appl. No.: 520,627

[22] Filed: Aug. 29, 1995

[51] Int. Cl.$^6$ .................................................. G06F 15/62
[52] U.S. Cl. ........................ 395/226; 395/50; 395/62; 395/200.11; 395/200.12; 395/200.2; 395/335
[58] Field of Search ......................... 395/201, 207, 395/210, 211, 226, 227, 235, 326, 329, 335, 10, 50, 60, 62, 614, 200.01, 200.11, 200.12, 200.2, 925

[56] References Cited

U.S. PATENT DOCUMENTS

| | | | |
|---|---|---|---|
| 5,347,632 | 9/1994 | Filepp et al. | 395/200.09 |
| 5,442,771 | 8/1995 | Filepp et al. | 395/200.09 |
| 5,455,903 | 10/1995 | Jolissaint et al. | 395/348 |

OTHER PUBLICATIONS

Hickey; "Shopping at Home: One Modem Line, No Waiting"; *Home PC*; Dec. 1, 1994; p. 307; Dialog: File 647, Acc# 01038162.

Lang; "Cashing In: The Rush is on to Buy and Sell on the Internet"; *Advertising Age*; Dec. 19, 1994; p. 11; Dialog: File 16, Acc# 05419137.

Arlen; "Cyberselling: Shopping Comes to the Web"; *Response TV*; Jul. 1995; p. 26; Dialog: File 16, Acc# 05681939.

Primary Examiner—Gail O. Hayes
Assistant Examiner—Stephen R. Tkacs
Attorney, Agent, or Firm—Cooley Godward LLP

[57] ABSTRACT

A system for facilitating commercial transactions, between a plurality of customers and at least one supplier of items over a computer driven network capable of providing communications between the supplier and at least one customer site associated with each customer. Each site includes an associated display and an input device through which the customer can input information into the system. At least one supplier is presented on the display for selection by the customer using the input device. Similarly items from a supplier can be displayed for the customer to observe. Associated with a supplier of such items is an item database including information on presented items. Pricing subsystem receives information from the item database to determine the cost associated with a presented item. In addition a customer information database stores information relating to the customer. Associated with each customer is a customer monitoring object for each customer. The customer monitoring object is created by referencing information, relating to that customer, which had been stored in the customer information database and when the customer selects a supplier. The customer monitoring object is configured to operate by responding to customer enquiries regarding a presented item by retrieving information relating to the item and presenting the information to the customer; receiving a customer's selection of a presented item; receiving customer communications, indicating a desire to receive the item; and passing a communication to initiate the delivery of the item to the customer.

49 Claims, 15 Drawing Sheets

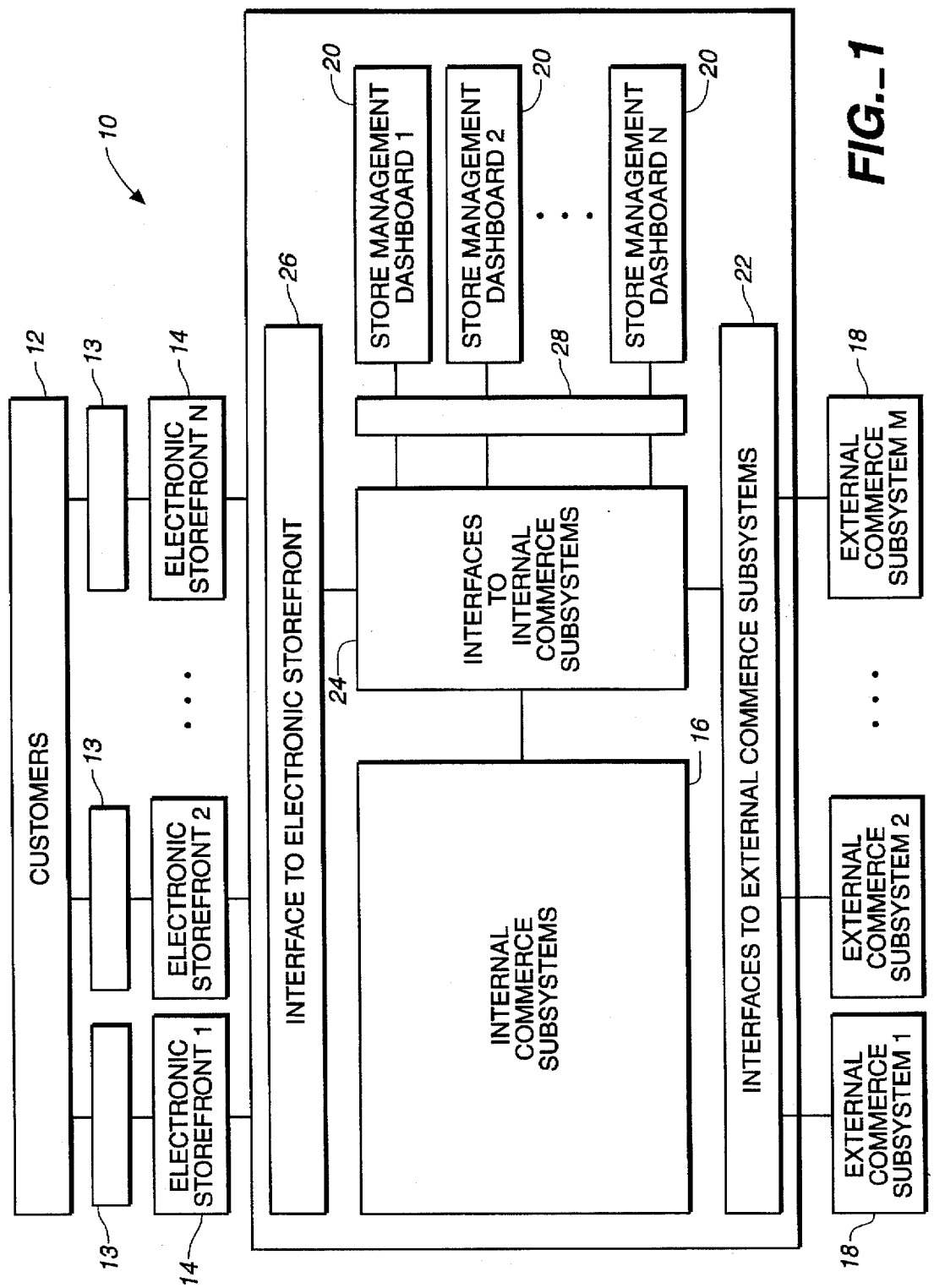
FIG._1

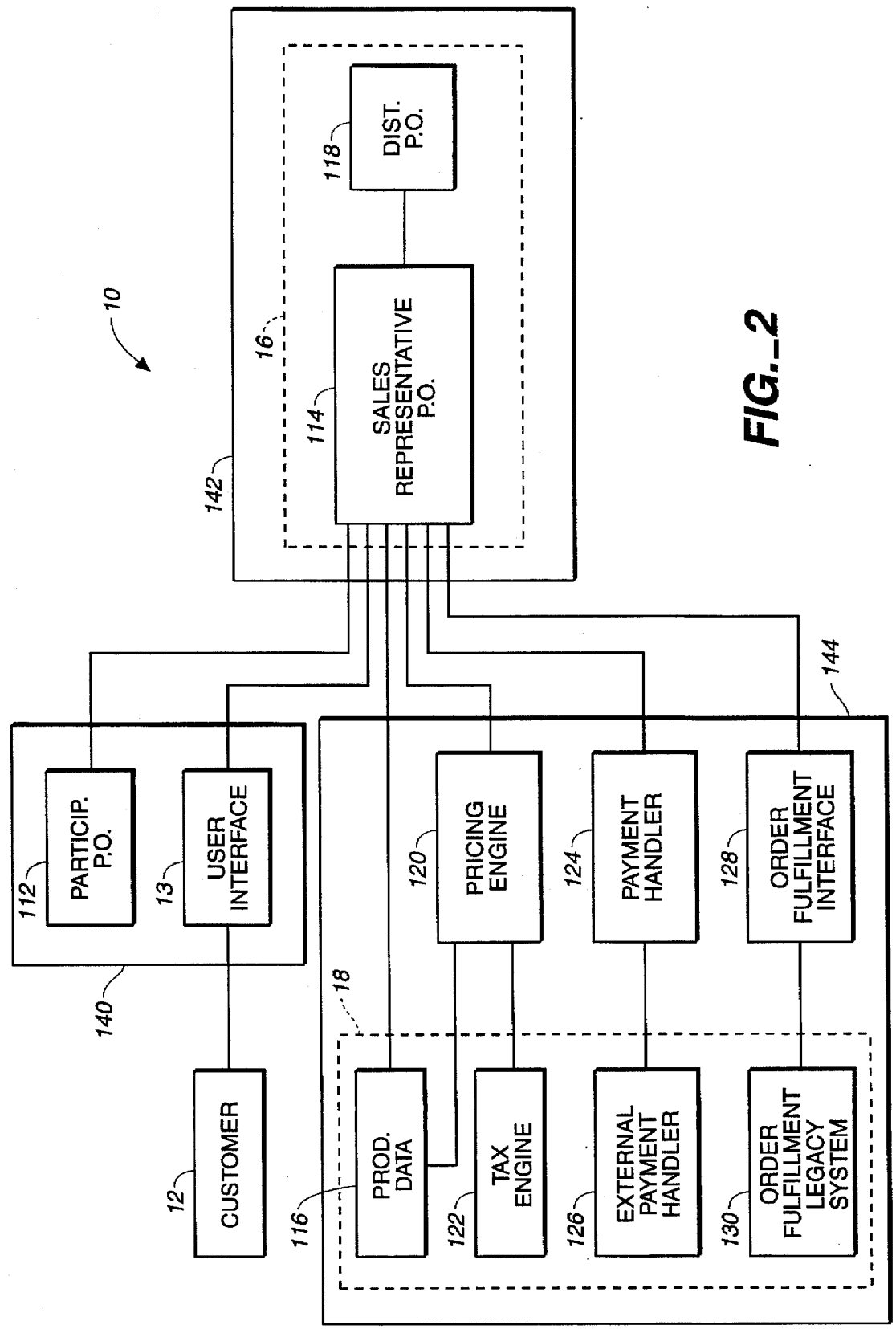
FIG._2

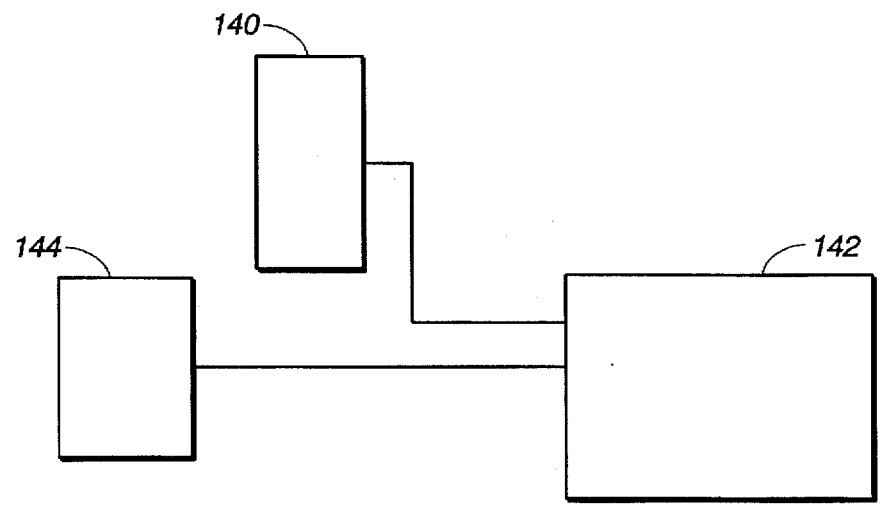
FIG._3
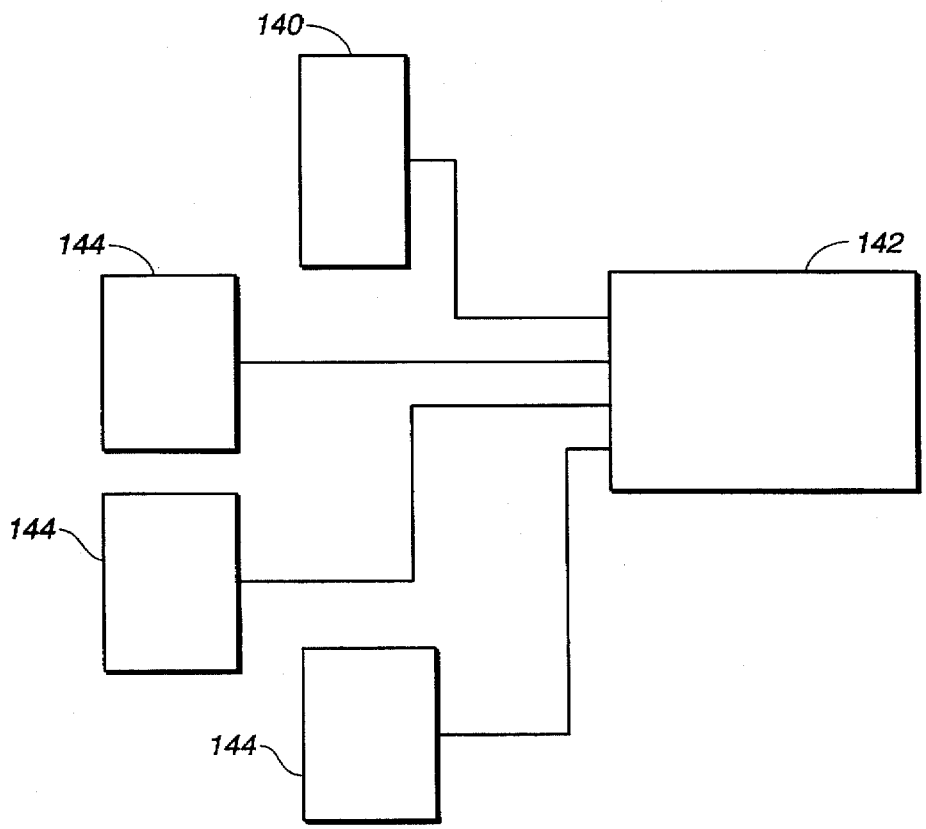
FIG._4

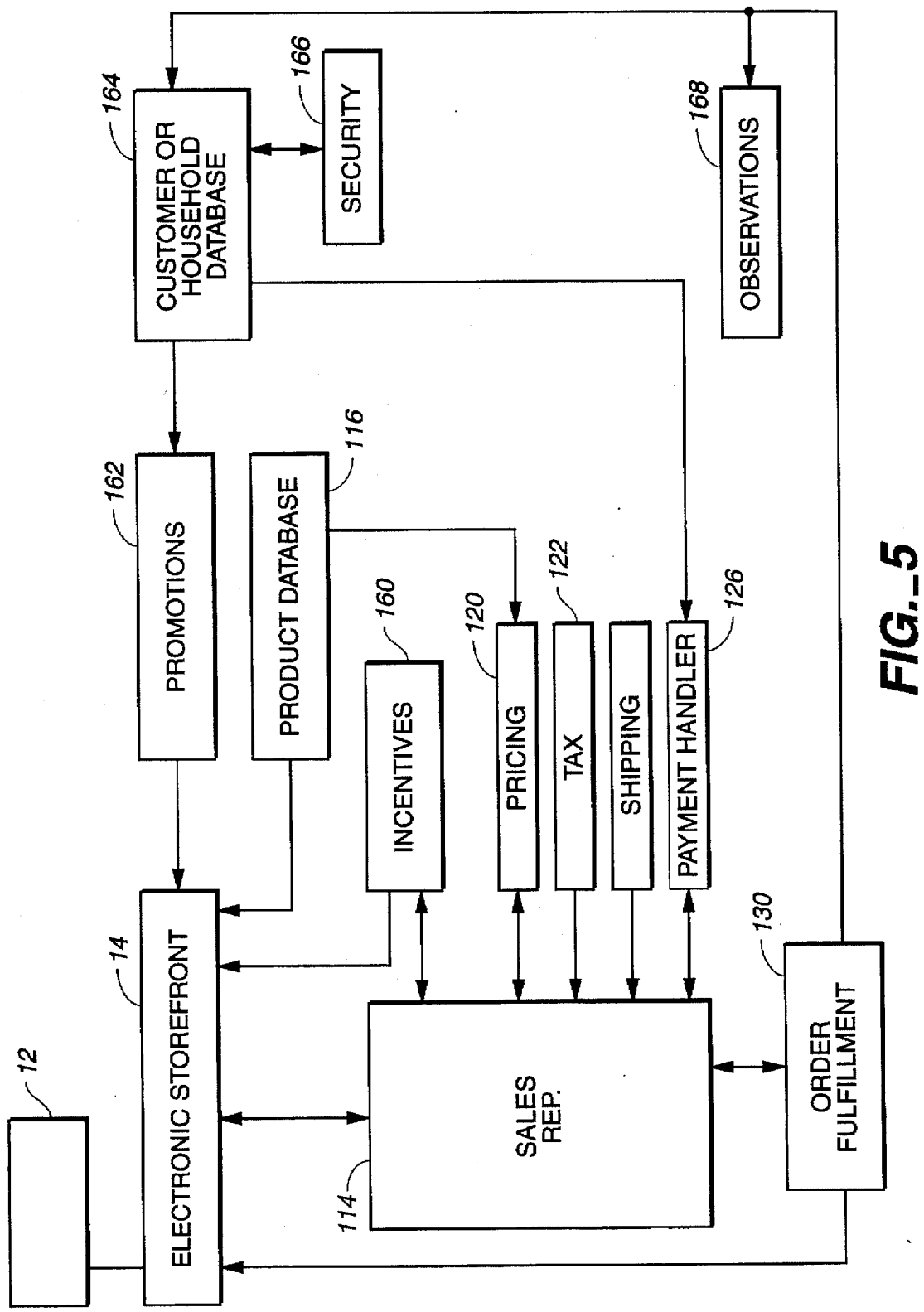
FIG._5

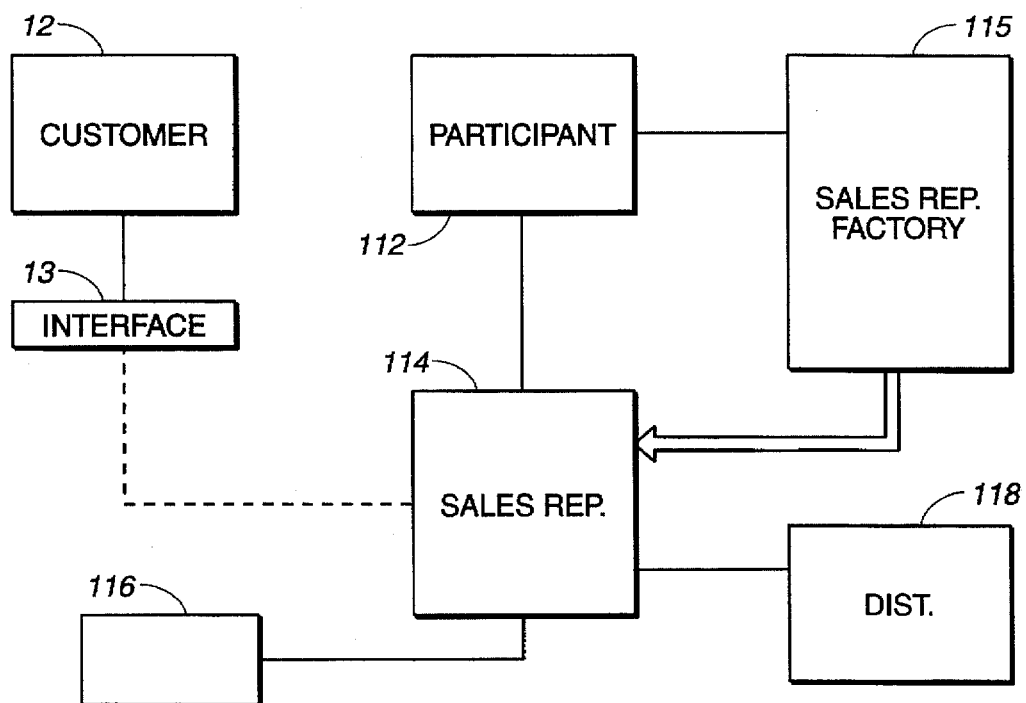
FIG._6
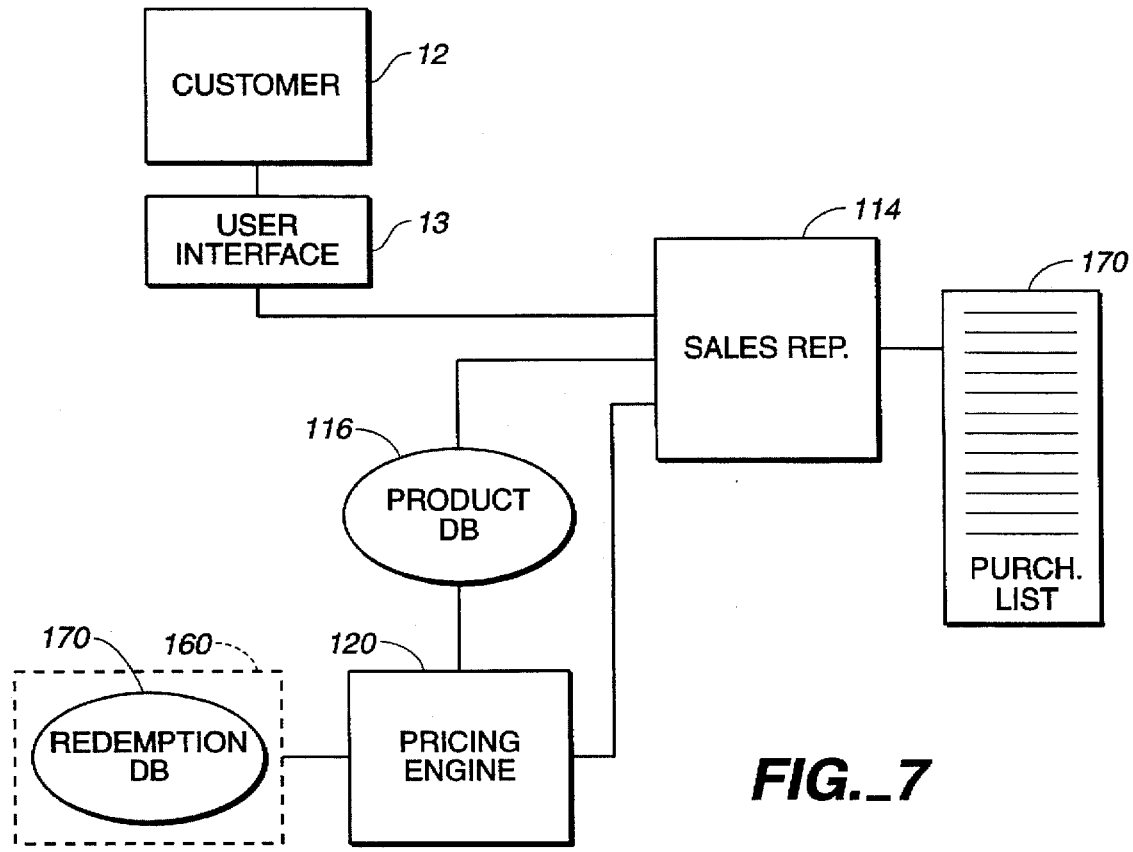
FIG._7

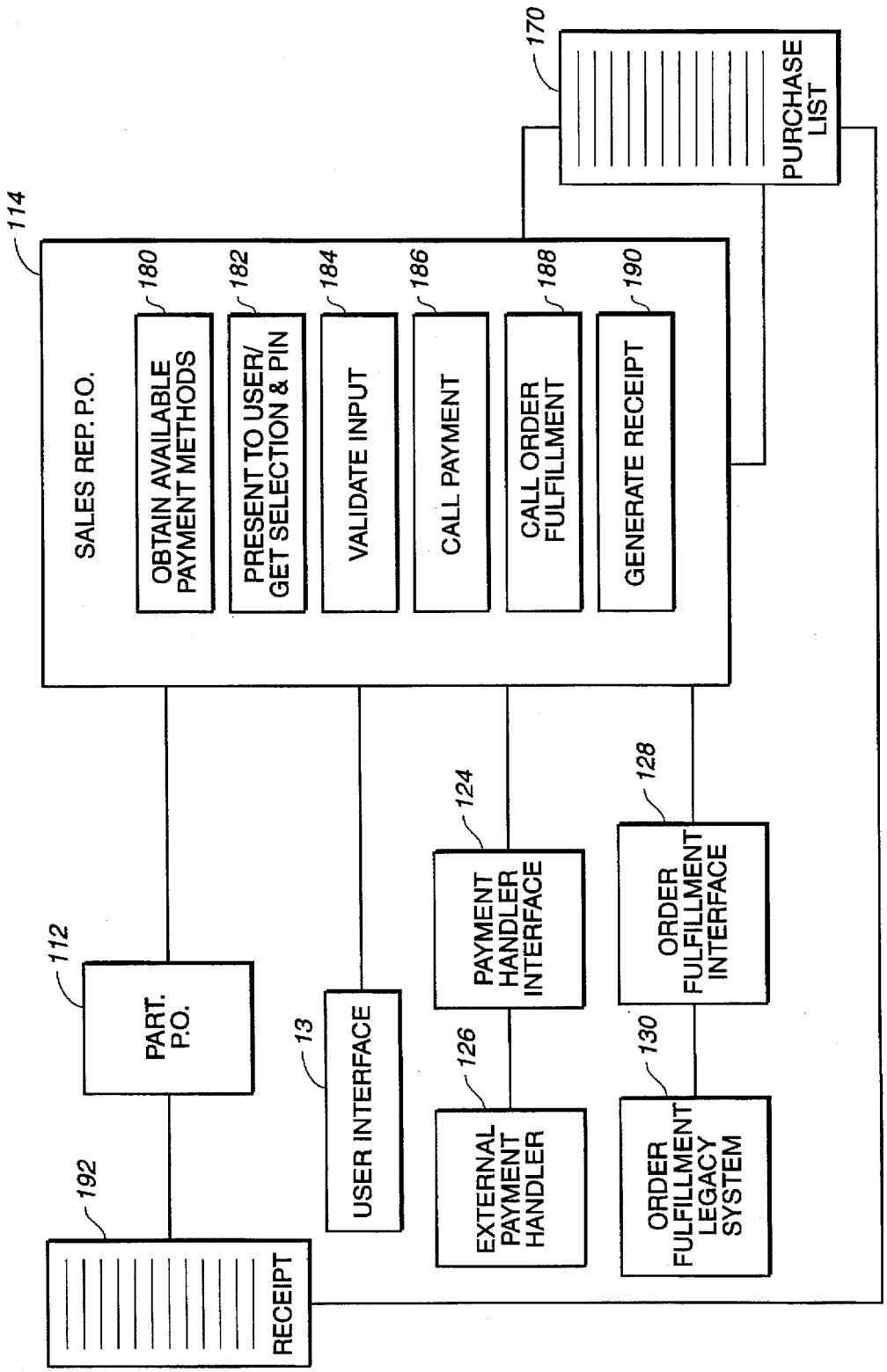

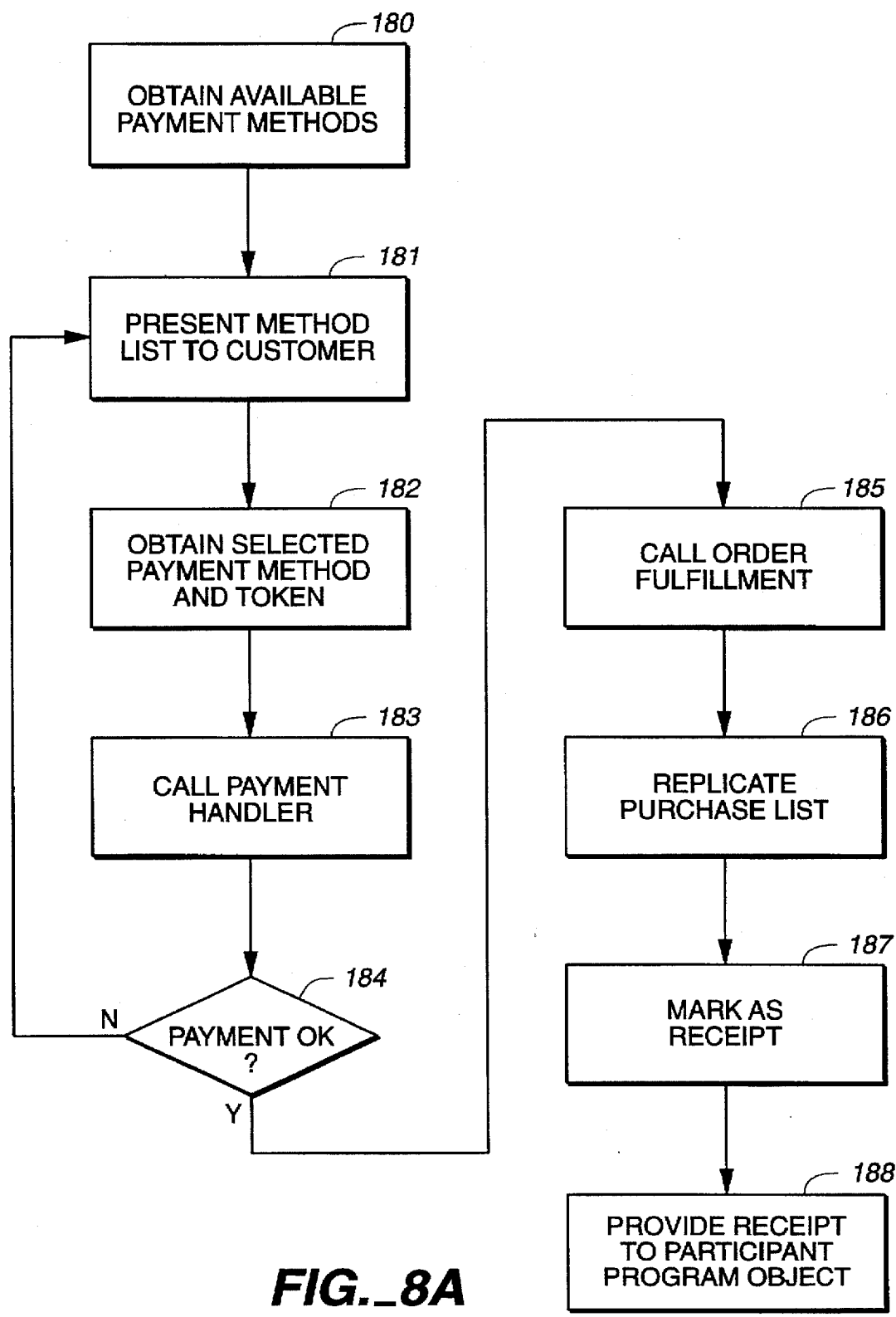
FIG._8A

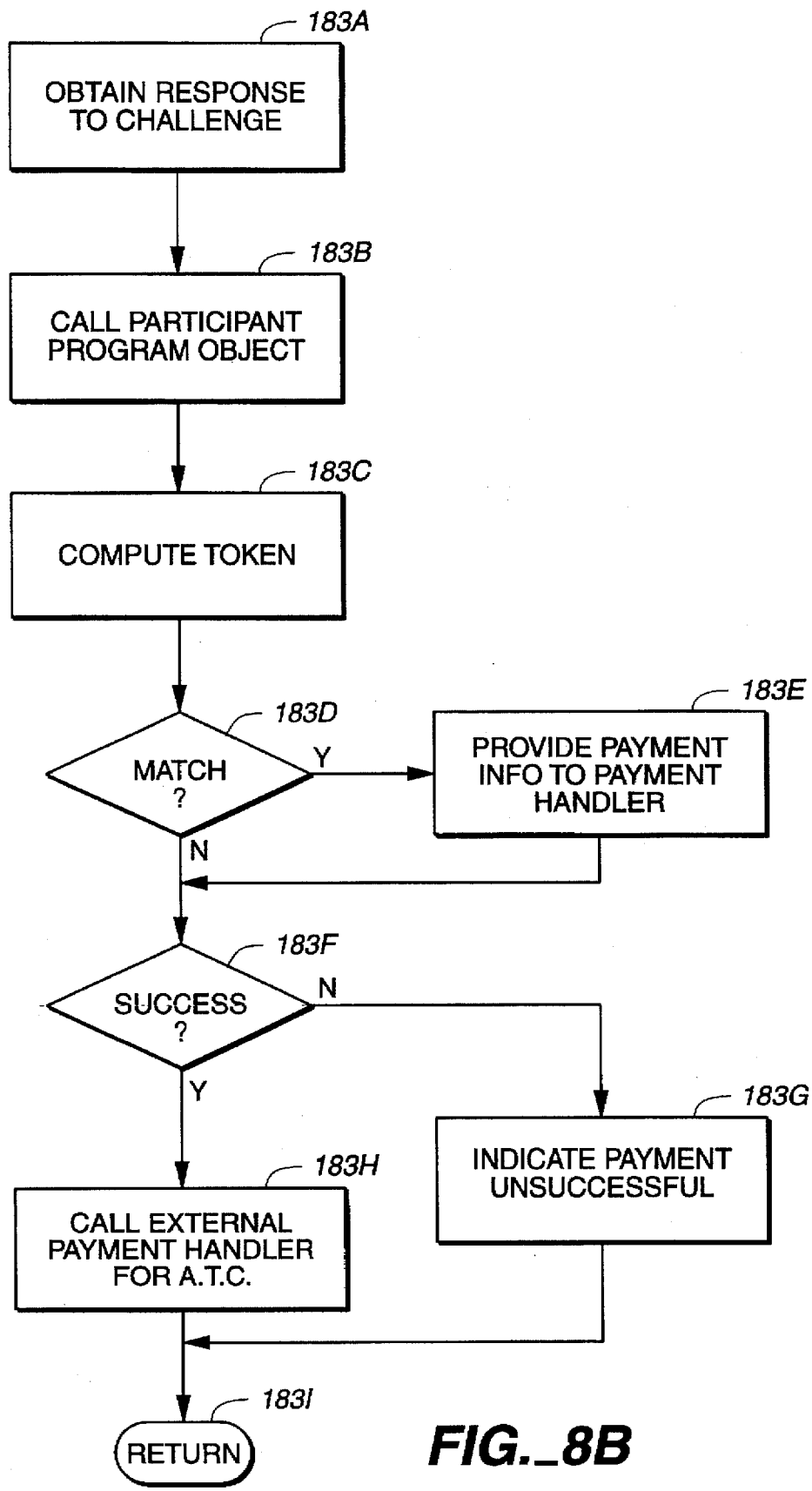
FIG._8B

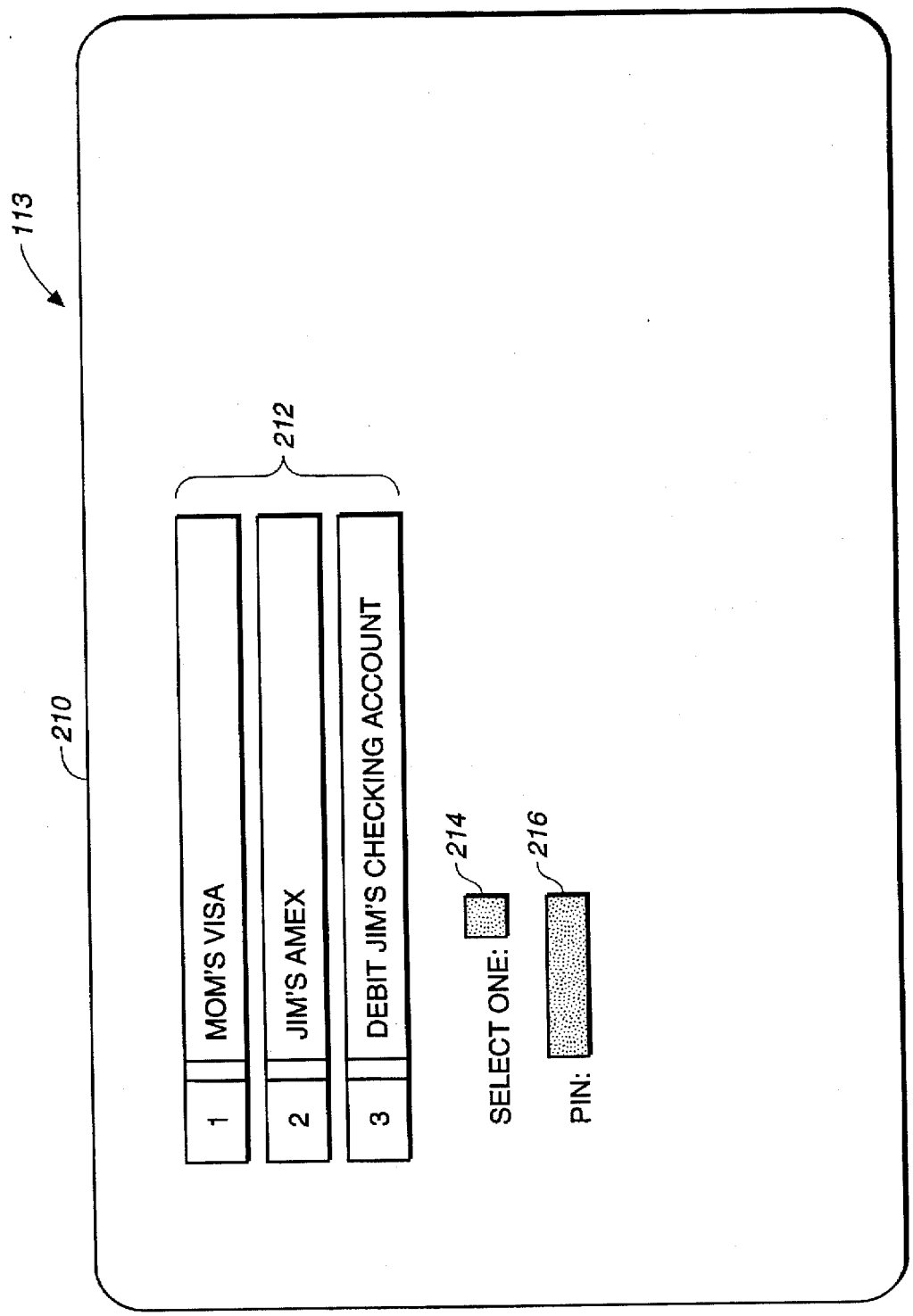
FIG._9

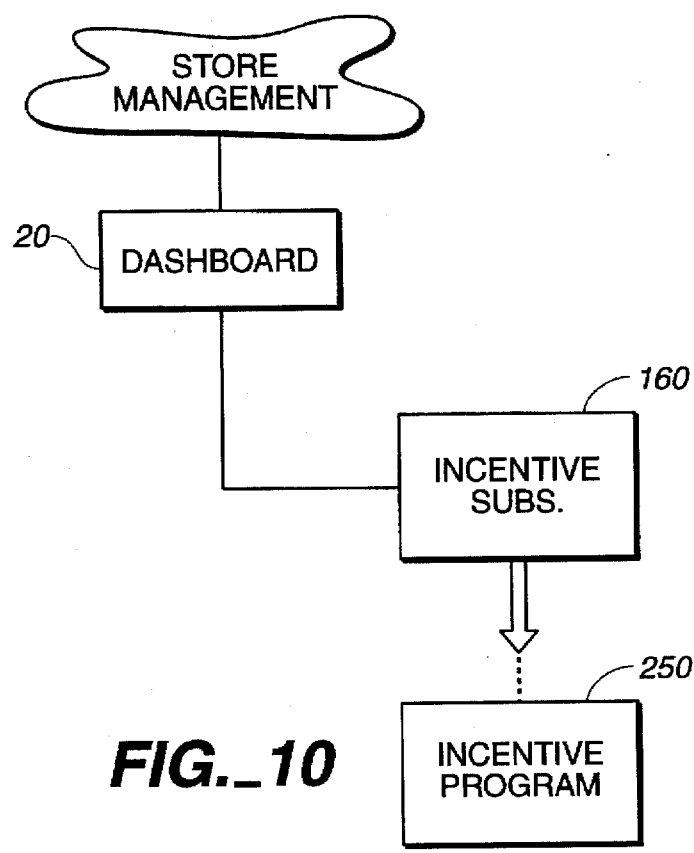
FIG._10
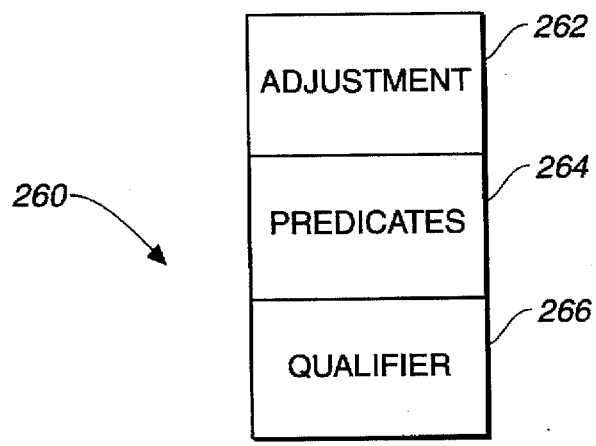
FIG._11

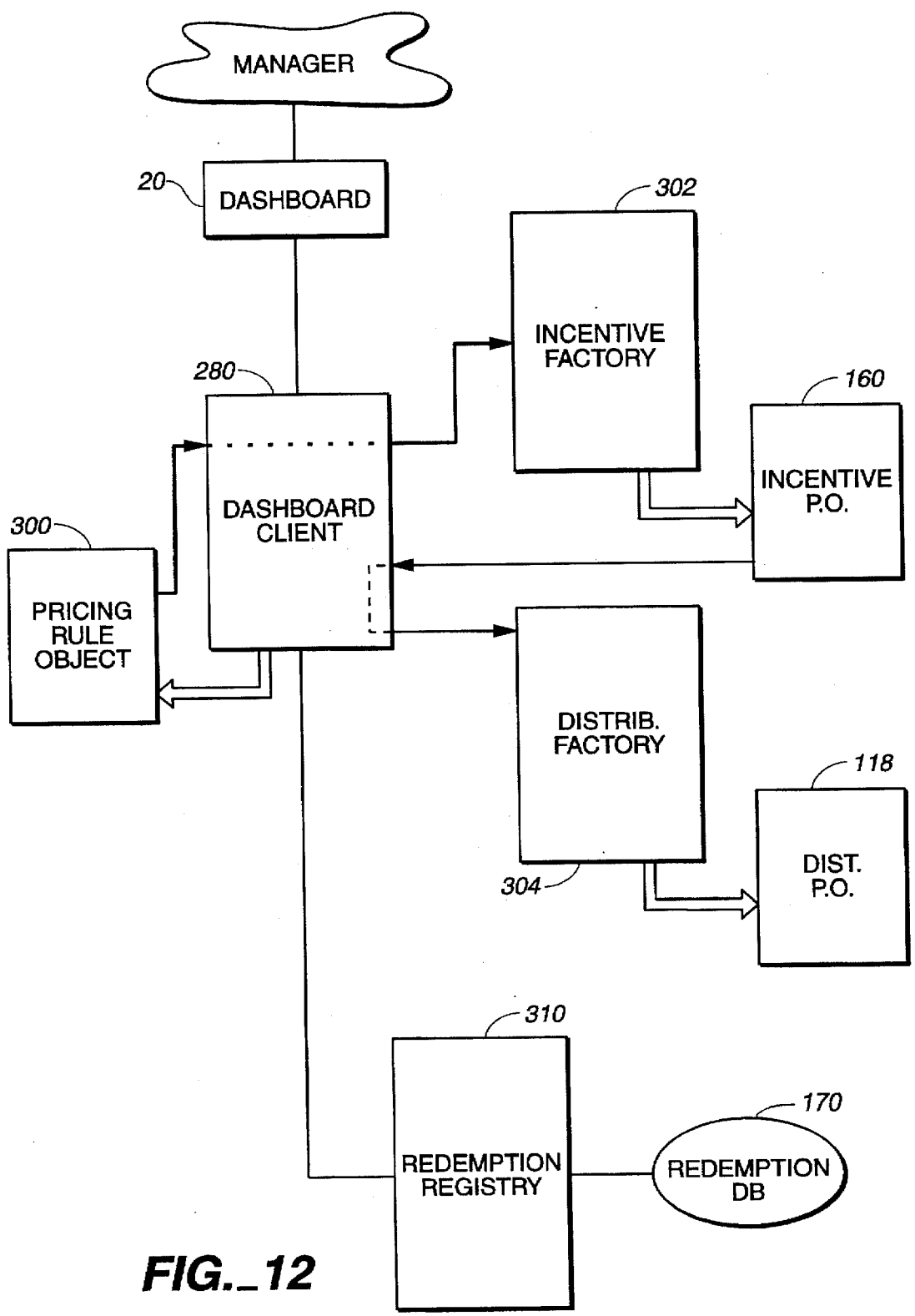
FIG._12

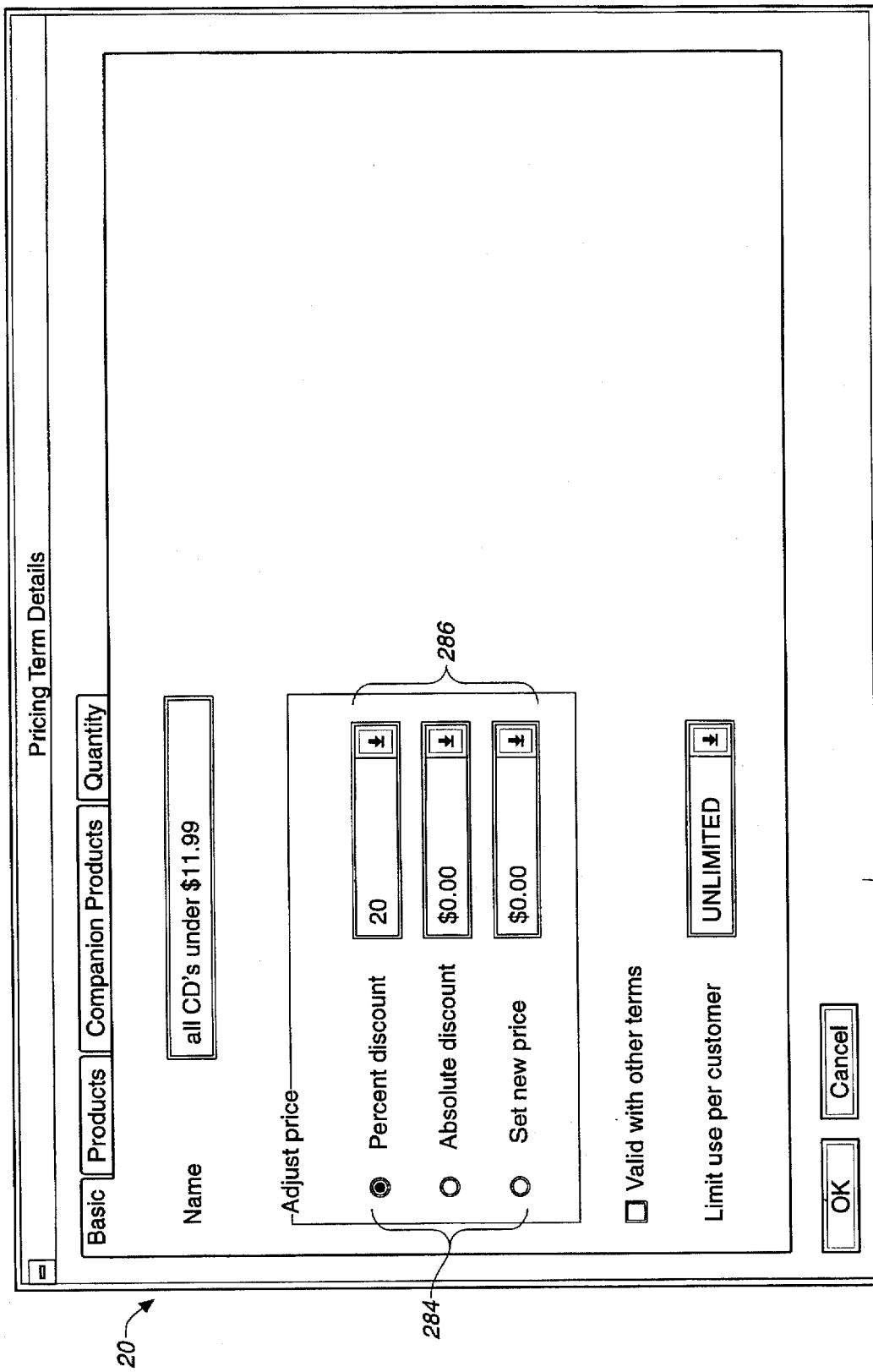
FIG._12A

FIG._12B

Sale Details

Name: July Weekend Specials

Description: Big discounts on selected titles every weekend in July

Dates: Start 07/01/96 09:00 A    Finish 07/31/96 06:00 P

Days: ☐ Mon  ☐ Tue  ☐ Wed  ☐ Thu  ☐ Fri  ☒ Sat  ☒ Sun

Terms:
10% off, selected new releases
20% off, all CD's under $11.99

Save
Cancel
Add Term
Delete
Edit

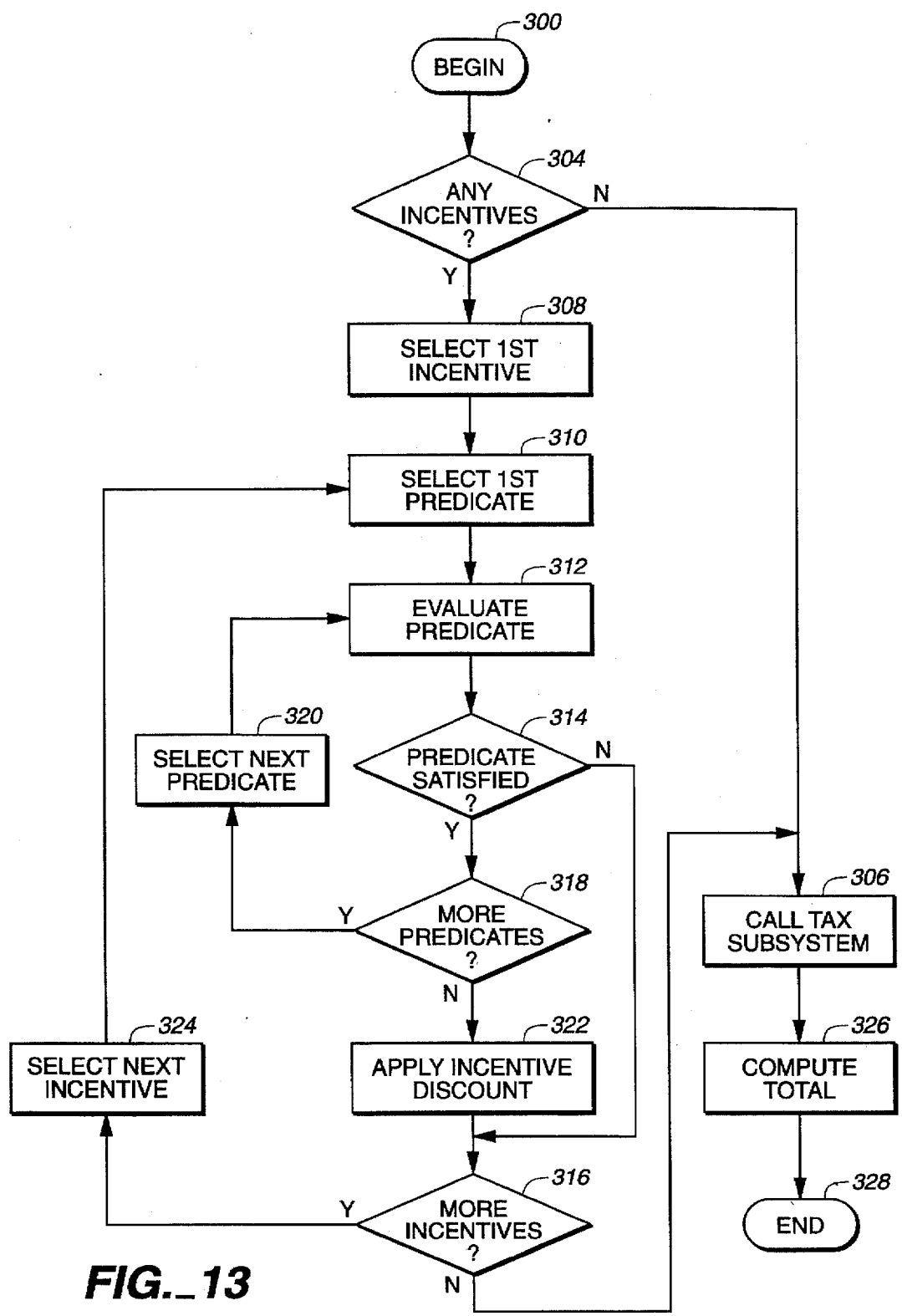
FIG._13

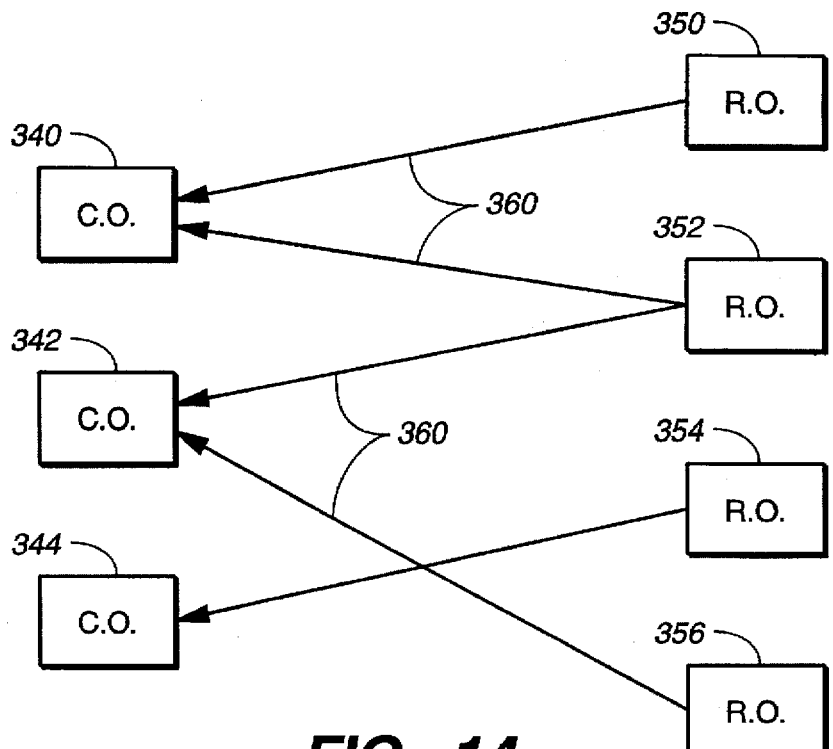
FIG._14
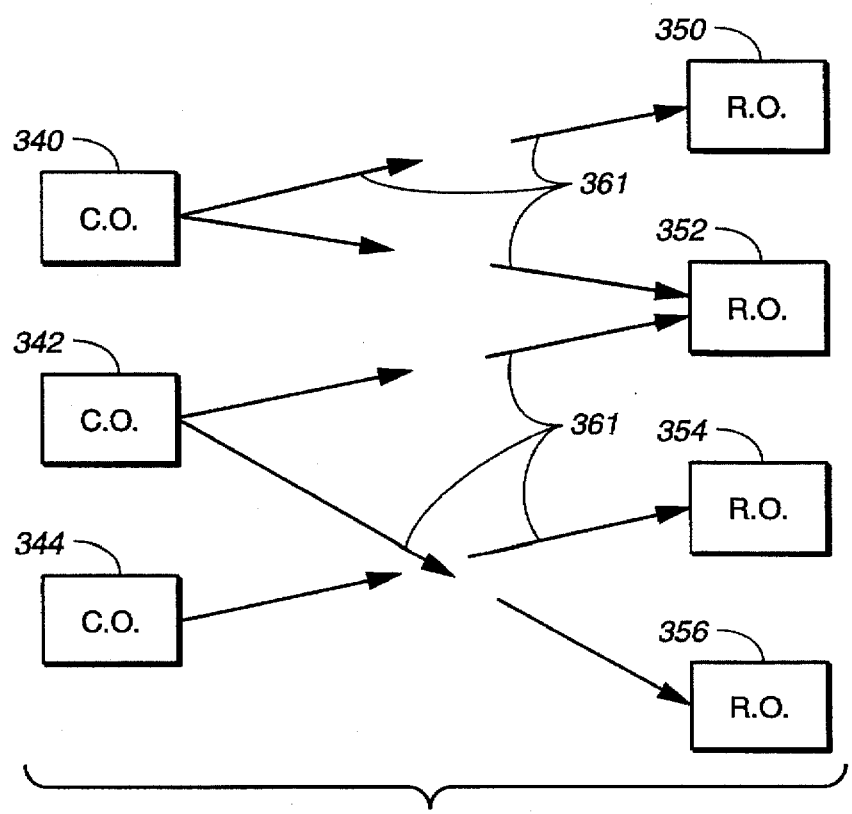
FIG._15

COMPUTER SYSTEM AND METHOD FOR ELECTRONIC COMMERCE

BACKGROUND

1. Technical Field

This invention relates to a system for conducting interactive electronic commerce among a plurality of participants, and more particularly to a computer architecture comprising a family of distributed, interface-compatible commerce subsystems, where each electronic store operator selects a particular combination of subsystem implementations to meet store specific operating needs.

2. Background

It is desirable to provide a system and method for conducting commerce via an electronic means, such as a computer network, cable television network, or direct dial modem. Previous attempts to provide electronic commerce subsystems have been custom tailored to an individual commerce offering, and have not been adaptable to be able to provide a versatile system capable of supporting a wide range of providers of goods and services.

To meet this need, several companies have developed computer architectures for online electronic catalog sales using, for example, the Internet as a transport mechanism to transmit data representing purchase requests between a proprietary browser and server product pair.

For example, Netscape Communications uses its Navigator/Netsite World Wide Web (WWW) browser/server pair. A buyer uses a Navigator to select a seller's Netsite server (sort of an electronic storefront), which is in turn coupled to standard application servers (back-end subsystems), e.g., a credit server or a member server for collecting demographic information on customers. These servers contain the business rules defined by the seller, e.g., what credit cards are accepted and what customer information is tracked during each sale. Some of these servers are connected to external, third-party services, e.g., the credit server to an external credit card processing network or the member server to an external demographics processing module. The actual applications e.g., on-line publishing or catalog sales, are represented as extensions of the application servers. Equivalently, the application servers are said to be instantiated in the applications. The net result of this approach is that the business rules (from the application servers) are embedded into the applications along with the application logic or presentation.

This model has a number of disadvantages. First, the system is limited to a single communications platform, the Internet. This is because the Navigator/Netsite software used to implement the model is dependent on the Transmission Control Protocol/Internet Protocol (TCP/IP) used in the Internet. The model has no provisions to allow communications to platforms not using TCP/IP, for example, interactive TV. Second, in the Netscape model, business flexibility is low because of the intermingling of business rules and application logic. It is more difficult to modify a portion of the resulting monolithic application than it would be to modify a portion of a smaller module of a modular application. This may have negative impacts on reliability and availability, because in certain cases it may be necessary to shut down the system to make changes that must be synchronized between two or more components. Third, such electronic catalogs support product display and secure payment processing, but not the marketing activities needed to induce customers into reading the electronic catalogs. Thus, there are no counterparts for physical commerce activities such as simultaneously offering a multitude of price discounts, performing targeted advertising, or collecting sales feedback.

Another company, Open Market, is developing a similar electronic catalog system consisting of a HyperText Markup Language (HTML) authoring tool (called Storebuilder), and a server (called WebServer) connected to an integrated back-end commerce system (called TransactionLink). This system appears to share similar characteristics and disadvantages as the Netscape system.

Thus, existing computer architectures for on-line electronic commerce are service provider-specific architectures that are platform-limited (the Internet) and require conformity to a fixed operating pattern using specified subsystem implementations. Such closed architectures may greatly limit their expandability or widespread acceptance. Even if widespread acceptance occurs, this is likely to be distributed over a number of competing systems, whose lack of interoperability may force customers to log on to different architectures for different transactions or force vendors to maintain equivalent operations on different architectures. Such architectures are aimed at a customer-retailer level of commerce, and even at that level, they do not support the intra-level competition (e.g., Compuserve's electronic storefront versus America Online's customer electronic storefront) that characterizes real-world commerce. The architectures are also too flat to support the complex inter-level hierarchies (e.g., manufacturer-distributor-retailer relationships) that characterize real-world commerce. Finally, the architectures do not accommodate the marketing activities necessary for customer generation. Overall, the existing architectures may be thought of as electronic catalog architectures rather than general electronic commerce architectures.

OBJECTS OF THE INVENTION

It is, therefore, an object of the invention to provide a system for facilitating commercial transactions over a computer driven network capable of providing communications between a supplier and at least one customer site associated with each customer and including an input means and a display.

It is a further object of the invention to provide an electronic commerce computer architecture which can accommodate a wide variety of implementations. For example, the architecture should accommodate the use of commerce implementations currently being used for physical commerce with little modification.

It is another object of the invention to provide actual implementations of some commerce subsystems where existing commerce subsystems used for physical commerce (e.g., marketing subsystems) are not readily extendible to electronic commerce or where those subsystems do not currently exist.

It is still another object of the invention to provide an electronic commerce computer architecture, comprising a family of interconnected commerce subsystems, where changes can be made to one subsystem without affecting the other subsystems.

It is yet another object of the invention to provide an electronic commerce system, comprising a family of interconnected commerce subsystems, where the subsystems can be distributed across many different platforms and networks.

Yet a further object of the invention is to provide an electronic commerce system which closely replicates commercial transactions in everyday life. As such it is another object of the invention to provide for an electronic assistant to assist a customer during interactions with the system to facilitate electronic commercial transactions.

SUMMARY OF THE INVENTION

Briefly, therefore, this invention provides for a system for facilitating commercial transactions, between a plurality of customers and at least one supplier of items. The commercial transactions occur over a computer driven network capable of providing communications between the supplier and at least one customer site associated with each customer. Each site includes an associated display such as a personal computer, set-top box, a touch sensitive screen, a touch tone telephone or any other device capable of reproducing to audio or video information to a human being. Each site typically also includes an input means such as a keyboard or computer "mouse" through which the customer can input information into the system.

The system of the invention facilitates the presentation of at least one supplier on the display for selection by the customer using the input means. Similarly items from a supplier can be displayed for the customer to observe. Associated with a supplier of such items is an item database including information on presented items. Pricing means receives information from the item database to determine the cost associated with a presented item. In addition a customer information database stores information relating to the customer. The system also comprises means for creating a customer monitoring object for each customer.

The customer monitoring object is created by referencing information, relating to that customer, which had been stored in the customer information database and when the customer selects a supplier. The customer monitoring object is configured to operate by responding to customer enquiries, communicated through the input means, regarding a presented item by accessing the item database to retrieve information relating to said item and to present said information to the customer by means of the display; receiving a customer's selection of a presented item through the input means; communicating with the pricing means to cause the cost of the item to be determined; presenting the cost to the customer by means of the display; receiving customer communications, through the input means, indicating a desire to receive the item; and passing a delivery initiation communication to initiate the delivery of the item to the customer.

The customer monitoring object can also be configured to maintain a list of selected items and to present the customer with a total cost of all selected items for approval before the customer monitoring object passes the delivery initiation communication. As part of this function, the customer monitoring object could be configured to present the customer with an opportunity to deselect an item whereupon the customer monitoring object causes the total cost of the remaining selected items to be redetermined and presented anew to the customer.

The system further comprises an order fulfillment initiation system, responsive to the delivery initiation communication from the customer monitoring object, for initiating proceedings to cause the item desired by the customer delivered to the customer. To enable this, it is preferable that the order fulfillment system include an interface with a shipping facility for facilitating the shipping of the desired item to the customer. Typically the shipping facility will be an existing facility known in the art.

To arrange payment for any transactions, the system of the invention further comprises a payment handler for initiating customer payment for the desired item. The payment handler is responsive to communications from the customer monitoring object. Also, the customer monitoring object is configured to confirm to the customer that the order for the item has been successfully processed.

Furthermore, the system includes a payment validation system by means of which the customer monitoring object receives the information related to the forms of payment available to the customer and presents the customer with a selection of the forms of payment. The customer also enters a first security code, related to a selected form of payment. Thereupon, the first security code is validated by comparison to a second security code available to the customer monitoring object. Payment for the item is initiated if the first security code is validated.

The system of the invention also allows for incentives to encourage the customer to complete a transactions. Such incentives could include cost reductions such as price discounts. Information regarding these cost reductions is stored within the system, often in association with specific information relating to the customer and also associated with a supplier's items. The pricing means receives relevant parts of the cost reduction information to calculate the cost of the associated item. Typically, the customer monitoring object is configured to receive cost reduction information communicate the reduction information to the pricing means.

The customer monitoring object is also configured to confirm to the customer that the order for the item has been successfully processed.

The system of the invention further comprises supplier control means for receiving input, from a supplier, for changing the cost reduction information. One way of doing this is by having the supplier control means receive an input, from a supplier, at a first time defining changes to the cost reduction information for a second time later than the first time. This enables a supplier to define in advance both the timing and the magnitude of the discount that is applied.

The customer monitoring means can be "short lived" and cease to operate on the termination of a transaction. Transaction termination is generally effected by a command from the customer. Alteratively, when the customer terminates interaction with the supplier, the customer monitoring object could temporarily cease to operate. In this case, information regarding at least the interaction is stored for retrieval at a subsequent time at which the customer interacts with the supplier. At that time the customer monitoring object recommences operation without being recreated.

The system further comprising a means for accessing the customer information database and for creating a participant program object. The participant program object includes customer specific information retrieved from the information database. The participant program object is in communication with and electronically represents the customer to the customer monitoring object. The participant program object is created at the time an interaction between the customer and the system commences. It preferably includes information related to forms of payment available to the customer.

The system may also comprise an observation system for receiving and maintaining customer interaction information relating to at least one customer's communications over the computer driven network. Preferably, the supplier control means is in communication with the observation subsystem and receives customer interaction information for display to the supplier. The supplier control can include an information processor for processing received customer interaction information; and means for selectively displaying at least a part of the processed customer interaction information to the supplier.

Additional features of the invention will become apparent upon examination of the description which follows particularly with reference to the accompanying drawings.

DESCRIPTION OF THE DRAWINGS

In the accompanying drawings:

FIG. 1 is a schematic representation of an electronic mall exemplifying the electronic commerce architecture of this invention.

FIG. 2 schematically depicts an embodiment of the invention configured to support transaction processing.

FIG. 3 depicts a compartment level view of the system of FIG. 2.

FIG. 4 depicts a compartment level view of the system, similar to that in FIG. 3 but with a plurality of Storefront Systems.

FIG. 5 schematically represents an outline transaction using the system of the invention.

FIG. 6 depicts the completion of the online transaction of FIG. 5.

FIG. 7 depicts the process by which a customer selects items for purchase in an online transaction of FIG. 5.

FIG. 8 depicts the completion of the online transaction in the commerce system illustrated in FIGS. 5 to 7.

FIG. 8A depicts the steps of FIG. 8 performed by the Sales Representative Program Object.

FIG. 8B depicts the steps of FIG. 8 performed by the Payment Handler Interface and Participant Program Object.

FIG. 9 depicts one example of the use of a User Interface to select the preferred payment method.

FIG. 10 schematically illustrates the creation of incentives in the system of the invention.

FIG. 11 depicts a Pricing Rule Structure.

FIG. 12 depicts the operation of a Dashboard Client to maintain the data needed to operate a storefront.

FIG. 12A depicts one view of the Dashboard Client as it appears to a storefront operator.

FIG. 12B depicts a second view of the Dashboard Client as it appears to a storefront operator.

FIG. 13 is a flowchart that depicts the operation of the Pricing Engine applying Coupons according to the invention.

FIG. 14 schematically illustrates the registration process of the Observations Subsystem.

FIG. 15 schematically illustrates the event notification process of the Observations Subsystem.

DESCRIPTION OF EMBODIMENTS

I. Overview

This invention relates to a computer architecture for on-line commerce which defines an electronic infrastructure to enable a full range of commercial transactions analogous to those occurring in physical commerce.

It is evident that a participant in electronic commerce might include a manufacturer of goods selling to a distributor, a distributor buying from a manufacturer and selling to a retailer, or a retailer buying from a distributor and selling to a consumer. The items sold need not be limited to goods, but could also include services such as videos downloaded to a viewer's multimedia display, as well as deliveryless transactions such as selling stock shares held in a central repository.

The Electronic Mall

It is useful conceptually to think of electronic commerce as exemplified by an electronic mall comprising a collection of suppliers of items such as goods or services, such as electronic stores, analogous to a physical mall comprising a collection of physical stores. In this example, each commercial transaction constitutes a sale from an electronic store to a customer of the electronic store, where a customer can be any participant in the electronic commerce architecture.

It should be noted, however, that electronic malls and stores are of vastly broader scope than their physical counterparts because the electronic mall can contain electronic stores composed of independent functional subsystems located at various platforms and networks in an electronic hyperspace encompassing the Internet, interactive TV, existing legacy systems, and many other electronic venues. Moreover, the electronic store is not limited in geographical reach (e.g., a national store is possible), in goods sold (e.g., physical products, digital information, and deliveryless transactional services are all possible), or to customer-merchant relationships (e.g., an entire distribution chain from manufacturer to consumer can be accommodated).

FIG. 1 shows an electronic mall, generally indicated as 10, that exemplifies the electronic commerce architecture provided by this invention. A Customer 12 enters the electronic mall via a user interface 13, where the customer is presented with a choice of displayed Electronic Storefronts 14. The user interface 13 may be a personal computer, set-top box, a touch sensitive screen, a touch tone telephone or any other device capable of reproducing to audio or video information to a human being. It typically includes an input means such as a keyboard or computer "mouse" through which the computer can input information into the system.

The customer enters a particular electronic store by selecting its Electronic Storefront 14, e.g., by clicking on an icon with a conventional selection or input device such as a mouse/curser device touchpad. As the customer enters the store, Internal Commerce Subsystems 16 are invoked by Electronic Storefront 14 to represent the store's interactions with the customer.

As the customer decides what items to purchase, External Commerce Subsystems 18 may be invoked to complete the transaction. For example, VISA's credit card network may be used for payment followed by FedEx's Powership shipping management software for shipping.

In the meantime, the store's management can use a Store Management Dashboard 20 to interface and control the Commerce Subsystems 16 and 18; for example, to establish in-store sales as incentives to the customer.

The Internal Commerce Subsystems 16, External Commerce Subsystems 18, Electronic Storefront 14, and Store Management Dashboards 20 interact with each other through Internal Commerce Subsystems Interfaces 24 and External Commerce Subsystems Interfaces 22.

II. Subsystem Overview

Following from the above it may be apparent that each electronic store in an electronic mall must be able to manage customer information, support targeted advertising, perform market research, execute on-line marketing programs like discount pricing, and ensure secure and reliable order and financial transaction processes, all within the context of its own operating style.

This invention provides such flexibility at the individual store level while supporting simultaneous transactions among a plurality of electronic stores, by defining a family of elementary Commerce Subsystems 16 and 18 necessary to support the various elements of electronic commerce, and allowing each store to select a particular combination of subsystems interconnected in a particular pattern to suit its particular operating style.

It may be useful to think of these Commerce Subsystems as "distributed objects" accessible to various of the stores and indeed to multiple stores, at the same time. Although not illustrated in FIG. 1, these Commerce Subsystems include: an Incentives Subsystem; an Observations Subsystem; an Order Fulfillment Subsystem; a Participant Subsystem; a Payment Handler; a Pricing Subsystem; a Product Database; a Promotions Subsystem; a Sales Representative Subsystem; a Redemption Registry; a Security Subsystem; a Shipping Subsystem; and a Tax Subsystem.

The Customer Accounts Subsystem is a store-specific repository which holds information on that store's customers' demographics and payment habits. Likewise, the Incentives Subsystem is a marketing module which allows stores to establish discount programs such as in-store sales, coupon-based discounts, frequent buyer programs, and quantity discount cards.

Similarly, the Participant Subsystem is a shared repository within the system architecture which stores general information on participants conducting electronic commerce with each other. The participants might include manufacturers, distributors, retailers, and customers; and information might include names and mailing addresses, preferred payment methods, etc.

For example, in the case of a household comprising multiple customers, some customer data will be household-specific (e.g., a single shipping address) while other customer data may be customer or store-specific (e.g., Mom's Macy's credit card number). This separation of household and customer data would also be useful for promotions based on household demographics, and other applications, where it is not necessary to send repeat advertisements to all members of a household.

The Observations Subsystem provides a system for recording events representing observable data that results from customer interactions. A program object called a "collector" communicates events to an event recipient. The event recipient can either record the event for subsequent historical analysis, or present it for real time analysis.

The Electronic Storefront, which is analogous to a physical store's physical layout, is the graphical user interface presented to a customer browsing that store.

The Store Management Dashboard 20 allows store management to change prices, offer incentives, collect customer-based and store-based sales data, and perform targeted advertising, i.e., interact with the various Internal and External Commerce Subsystems discussed earlier. It is anticipated that stores will want to use their own proprietary Electronic Storefronts, so the architecture provides an interface to be used by an existing Electronic Storefront rather than providing the Electronic Storefront itself. For example, existing commercial services having proprietary electronic storefronts (e.g., America Online's or Compuserve's home shopping forums) will probably want to continue to use those storefronts even if they become networked into a broader electronic commerce architecture provided by this invention.

Architectural Openness and Flexibility

As discussed briefly above, the Commerce Subsystems may be categorized as either external or internal. The difference between the two is that in the former, the invention provides only standardized interfaces to the commerce subsystems, while in the latter, the invention can provide actual subsystem implementations as well as the interfaces. This distinction provides great openness and flexibility by allowing electronic commerce participants to select External Commerce Subsystems from a variety of currently existing business subsystems, while providing Internal Commerce Subsystems for those Commerce Subsystems where currently existing business subsystems either do not exist or are unadaptable from physical to electronic commerce. In either case, the architecture provides standardized interfaces through which Commerce Subsystem implementations communicate with the architecture. Thus, the distinction between External and Internal is somewhat arbitrary, as it reflects the commercial availability of existing subsystem technologies rather than any fundamental difference between the two subsystem categories.

Thus, each of the Internal and External Commerce Subsystems is a self-contained, independent module connected into the architecture through a standardized interface. The modules as a whole can be arranged in any combination for any particular store. Note that the above categorization of Commerce Subsystems as Internal or External is exemplary, not mandatory. That is, a particular subsystem may have both Internal and External embodiments. For example, some vendors may develop proprietary External Commerce Subsystems to replace the Internal Commerce Subsystems originally provided by this invention. In those cases, the system architecture would be able to accommodate either an Internal or External implementation of the Commerce Subsystem, with each electronic commerce participant being able to select a combination of specific implementations that best suits the participant's needs.

External Commerce Subsystems

Many existing Commerce Subsystems used for physical commerce can be used for electronic commerce without modification. These technologies are referred to as External Commerce Subsystems. Such subsystems operate identically whether the sale occurs in a physical or electronic store, so that their implementations are the same in both physical and electronic commerce. They could include: Customer Accounts Subsystem, Participant Subsystem; Order Fulfillment; Payment Handler; Product Database; Shipping; and Tax.

Examples of well-known existing implementations of these subsystems are: VISA's computerized credit card network (Payment Handler), various catalog sales' central warehouse operations (Order Fulfillment), FedEx's on-site, personal computer-based shipping calculator (Shipping), and AVP's tax calculator (Taxing).

Many physical stores will have different External Commerce Subsystems that they will want to continue using in the context of an electronic store. For example, other Payment Handler systems might include CheckFree's automatic check handling system for non credit-card acceptors or in-house "legacy systems" for large department store chains. Therefore, the system architecture must accommodate a wide variety of existing subsystems. Rather than developing new subsystems to displace individual stores' established preferences, the system architecture provides a set of application program interfaces (APIs) through which owners or vendors of External Commerce Subsystems can easily "wrap" their products for connection to the general system architecture.

Internal Commerce Subsystems

The remainder of the Commerce Subsystems are called Internal Commerce Subsystems—those where existing subsystems for physical commerce can not be directly used in electronic commerce, so that separate electronic counterparts must be developed for use by electronic stores.

Such Internal Commerce Subsystems might include: Incentives; Observations Subsystem; Participant Subsystem; Pricing; Promotions; Sales Representative; and Security.

Some of these subsystems, though not currently in existence for use in electronic commerce, nevertheless use well-established, commercially available technologies. These could include Oracle or Sybase databases for the database components of the Observations and Participant Subsystems, and RSA Public Key encryption technology for the Security Subsystem. These Internal Commerce Subsystems are developed by simply wrapping the aforementioned technologies with the appropriate hooks to interface with the standardized APIs. The process is similar to that third party developers would use to create interface-compatible External Commerce Subsystems.

The four remaining Internal Commerce Subsystems, which are not generated by modifying existing technologies, are the Incentives Subsystem, the Pricing Subsystem, the Promotions Subsystem, and the Sales Representative Subsystem. The details of these will be apparent from a reading of the specification as a whole.

III. Implementation

To implement the above, and as will be apparent from the description of FIG. 2, the system comprises a set of program objects.

A program object is an integrated collection of data and functions that describe an entity or business function, and the operations that can be performed on or by the entity or business function. Program objects can also access databases, and serve as interfaces to non-object-oriented subsystems. The program objects may be, for example, objects in compliance with the Object Management Group's (OMG's) Common Object Request Broker Architecture (CORBA).

CORBA provides mechanisms by which objects may transparently make requests and receive responses. CORBA also provides for an Object Request Broker (ORB), which provides interoperability between applications on different computers in heterogeneous distributed environments and seamlessly interconnects multiple object systems. The advantage of compliance with an architecture such as CORBA is that the program objects may be distributed among various computers according to the business needs and responsibilities of the entities involved in the system.

FIG. 2 illustrates a number of the program objects necessary to implement an embodiment of the invention. As such, the figure shows a plurality of program objects interacting to support the execution of a commercial transaction.

To begin with, a participant or customer 12 interacts with the system 10 by way of a user interface 13. User Interface 13 may be in the form of a video terminal, a cable television set-top device, a touch-sensitive kiosk screen, a touch-tone telephone, or any other device or combination of devices capable of reproducing or otherwise displaying human intelligible audio and/or visual information to a customer 12 and capable of converting human input to a discrete signal capable of being recognized by a computer.

Notwithstanding this interaction, however, it is a Participant Program Object 112 that represents the customer 12 in the commerce system. The Participant Program Object 112 contains information that identifies the participant 12, and additional information about the participant, for example, the participant's name, address, privacy controls, demographic data, and methods available to the participant for payment. Access by a store to the information about a participant is controlled by a flexible mechanism in the Participant Subsystem. This mechanism supports enforcement of a variety of privacy policies. These policies may be specified by the operator of the Commerce System, by the individual participant, or by a combination of the two. Different privacy policies may be specified for each element of the participant data for each individual customer. The policy data is stored with a Participant Program Object 112 as part of the privacy controls, in a Participant Subsystem which will be described in greater detail with reference to FIG. 5.

For each payment method, the Participant Program Object 112 contains a short token used to describe the payment method and a password that will be used to validate attempts to use the payment method.

Typically, the Participant Program Object 112 is created for a participant 12 at the time that the participant is registered with the electronic service from which he or she will interact with the commerce system. For example, if the electronic service is an online service such as Compuserve or America Online, a Participant Program Object 112 is created at the time the customer enrolls with the online service. Likewise, if the electronic service is a cable television provider, a Participant Program Object 112 is created at the time that the participant 12 begins subscribing to the cable television provider. In this way, sensitive information such as credit card account numbers and passwords may be provided using a secure means at account initiation.

The Participant Program Object 112 communicates with a Customer Monitoring Object or Sales Representative Program Object 114. Sales Representative Program Object 114 is a program object that is created when the customer selects a store. The Sales Representative Program Object 114 has access to information, kept by the store, about the customer and also controls the flow of a transaction processing session and forms part of an Internal Commerce Subsystem 16 shown in FIG. 1. As will be described in detail, Sales Representative Program Object 114 is used to obtain information regarding items that are the subject of the transaction, and initiate clearance for payment and order fulfillment.

The Sales Representative Program Object 114 is analogous to a sales representative in a store. Just as a sales representative has the responsibility of monitoring the customers activity by being aware of prices of products and discounts available to the customer, and by initiating completion of the transaction, the Sales Representative Program Object 114 carries out these tasks in the online commerce system.

Interaction between the Sales Representative Program Object 114 and the customer 12, to communicate information about, for example, items desired to be purchased, is through the User Interface 13.

The Sales Representative Program Object 114 communicates with a Product Database 116 through Pricing Engine 120. Product Database 116 is part of the External Commerce Subsystems 18 and is a computer file or set of computer files, including, if necessary, supporting software components for the retrieval of data. Product Database 116 includes information regarding items that are offered as the subject of transactions. This information includes the name of the item, item identification numbers, standard price for the item, manufacturer, etc. The Product Database 116 may be implemented using any of a number of commercially available database systems, such as Oracle or Sybase. The Product Database 116 accepts function calls from the Sale Representative Program Object 114 to provide information about a particular item.

Also provided is Distributor Program Object 118, which is part of the Internal Commerce Subsystems 16, and is a program object that provides information regarding Coupons 119 to the Electronic Storefront 14. Coupons are data structures that describe incentive programs in the form of discounts that made available to the customer to encourage purchase of items, and are further described below.

A Pricing Engine 120 is responsive to function calls from Sales Representative Program Object 114 is also provided. Pricing Engine 120 is a program object that provides information about the price of a set of items selected for purchase. The Pricing Engine 120 accesses the Product Database 116 to determine attributes of selected items, and applies incentives obtained from Distributor Program Object 118 to determine a price that will be charged to the customer.

The Tax Engine 122, part of External Commerce Subsystems 18, is a program object that determines what tax, if any, should be applied to a particular transaction, based upon the items that are the subject of the transaction, the geographical locations of the participant and the electronic commerce system, etc. The Tax Engine 122 is responsive to function calls from Sales Representative Program Object 114 and may be implemented, for example, using a commercially available tax calculation system, such as the AVP Tax Engine.

The Shipping Cost Engine 123, part of External Commerce Subsystems 18, is a program object that determines the cost, if any, of shipping purchased items to the location designated by the customer, based upon the properties (such as weight, size, and special shipping requirements) of the items that are the subject of the transaction, the geographical locations of the participant and the electronic commerce system, etc. The Shipping Cost Engine 123 is responsive to function calls from Sales Representative Program Object 114 and may be implemented, for example, using a commercially available shipping cost calculation system.

Payment Handler Interface 124 is provided to initiate payment for a transaction. This is a program object that is responsive to Sales Representative Program Object 114. Typically, the Payment Handler Interface 124 will serve as a front-end to convert an object-oriented function call, such as a CORBA call, to a call to an External Payment Handler 126, part of External Subsystems 18. The External Payment Handler 126 may be implemented using a commercially available payment handling system, such as Visa Corporation's VISAnet (not shown).

To initiate delivery of the selected items to the customer Order Fulfillment Subsystem 128, a program object that is responsive to Sales Representative Program Object 114, is provided. Typically, the Order Fulfillment Subsystem 128 will serve as a front-end to convert an object-oriented function call such as a CORBA call to a call to an external subsystem that performs order fulfillment. An example of such an external subsystem is Order Fulfillment Legacy Subsystem 130. The Order Fulfillment Legacy Subsystem 130 may, for example, be a store's existing subsystems for delivering a product or a service to the consumer.

This figure also depicts one possible configuration of components distributed among multiple logical compartments of the commerce subsystem. A logical compartment may be a distinct computer system, or it may be a set of resources in a computer system or set of computer systems to which the enterprise responsible for the compartment has access.

In the example depicted in this FIG. 2, Participant Program Object 112 and User Interface 13 are configured in what can be called a Customer Contact System 140. Customer Contact System 140 may be, for example, an online service such as Compuserve or America Online, an application interface at a cable television site accessed remotely by a customer using a set-top box, or a World-Wide Web (WWW) site on the Internet accessed by a customer using a WWW browser application across a TCP/IP connection.

Similarly, the Sales Representative Program Object 114, Product Database 116, Pricing Engine 120, Tax Engine 122, Shipping Cost Engine 123, Payment Handler Interface 124, External Payment Handler 126, Order Fulfillment Subsystem 128, and Order Fulfillment Legacy System 130 are configured in an In-Store Processing System 142. In-Store Processing System 142 may be, for example, a computer system used to administer one or more of the electronic Storefronts 14 shown in FIG. 1.

FIG. 3 depicts only the compartment level view of the system depicted in FIG. 2. In-Store Processing System 142 is depicted in communication with Customer Contact System 140.

As an expansion of this view, FIG. 4 depicts a compartment level view of the system, with a plurality of In-Store Processing Systems 142. In such a configuration, the commerce system operates to facilitate commerce with multiple commercial entities, analogous to the shopping mall supporting multiple stores as described above.

IV. Transaction Processing

Overview of an Electronic Store Transaction

To more fully understand the operation of the invention, it is useful to concentrate on a transaction in a single electronic store. FIG. 5 shows an overview of a simplified logic flow for a typical transaction.

A Customer/Participant 12 enters an electronic storefront 14 and is presented with the store's Product Database 116 in connection with in-store sales, presented by the Sales Representative 114 together with an Incentives Subsystem 160 and narrowcast advertising targeted at the Customer through a Promotions Subsystem 162 based on the Customer's demographics or purchasing habits as defined by a Participant Subsystem 164 and Customer Accounts Subsystem 117.

In response, the Customer passes product or service selections to the Sales Representative 114. The Sales Representative 114 obtains pricing information from the Incentives Subsystem 160 to get pricing rules, and then passing the selection list and the pricing rules to the Pricing Engine 120, which calculates and returns discounted prices by matching the selection list against the pricing rules using product information from the Product Database 116.

The Sales Representative 114 then calls subsystems such as Tax Engine 122 to calculate Tax and Shipping. Thereafter, the Sales Representative 114 returns a total price to the Customer 12, who returns a final order to the Sales Representative.

Thereafter, the Sales Representative 114 arranges for Payment. This includes querying the Customer for a payment method (e.g., VISA card) and a means of authenticating the identity of the Customer (e.g., a password); querying the Participant Subsystem 164 for payment information corresponding to the payment method (e.g., looking up the customer's VISA card number, which is secure from the store); calling a Payment Handler 126 to validate the password and to authorize the credit transaction with an external payment network (not shown), e.g., VISAnet.

Next, the Sales Representative 114 transmits the order to the Order Fulfillment Subsystem 128. Order Fulfillment Subsystem provides Sales Representative 114 with a receipt to be placed in the Participant Program Object 112 as an indication that the order has been processed; calls Order Fulfillment Legacy System 130 to arrange for delivery of goods to the customer; and calls Payment Handler Interface 126 to settle the payment. Order Fulfillment Legacy System 130 also feeds back data to update the Participant Subsystem and the Store Sales database, part of Observation Subsystem 168.

Details of the Transaction

The above reflects an overview of a typical transaction. To more fully understand and describe this transaction it is useful to divide it into its three phases:

(a) initiation of a shopping session;

(b) selection of items to be purchased; and (c) completion of the shopping session.

Each of these phases is described in greater detail below:

(a) Initiation of Session

FIG. 6 depicts the initiation of a shopping session using the system of the invention.

When the Customer 12 "enters" a Storefront 14, Participant Program Object 112 is retrieved from the Participant Subsystem and activated. Storefront 14 determines what Distributor Objects 118 exist to distribute coupons that can be used by this storefront. This may be accomplished, for example, through the use of a nameserver such as that specified by the CORBA Object Request Broker. Storefront 14 calls Sales Representative Factory 115, passing to it the Participant Program Object 112 and the list of Distributor Objects 118.

Sales Representative Factory 115 is a special-purpose program object whose purpose is to create, or "instantiate," a Sales Representative Program Object 114. Sales Representative Factory 115 instantiates a Sales Representative Program Object 114 in response to a request from the Storefront 14. Once created, Sales Representative Program Object 114 initializes itself.

Sales Representative Program Object 114 obtains from Participant Program Object 112 any Coupons 119 that have been retained by Participant Program Object 112 from prior shopping sessions. Sales Representative Program Object 114 also calls Distributor Program Objects 118 to obtain any additional Coupons 119 that represent current sales in Storefront 14.

After the Sales Representative Object 114 is created, it figuratively accompanies the customer through the store, provides pricing information, authorizes the purchase method (e.g., VISA), applies any applicable discounts (e.g., in-store price discounts or coupon-based price discounts), and completes the sale (e.g., ships the items and arranges for payment). In one embodiment of the invention, the Sales Representative Object 114 is dedicated to the Customer 12 until the Customer 12 completes that session but does not outlive a shopping session. In another embodiment of the invention, the Sales Representative Object 114 may span several sessions. The life of Sales Representative Object 114 is terminated upon payment (or billing frequency), which is specified by Store Management. For example, if billing is per session, the Sales Representative Object 114 only lasts for that session; but if billing is monthly, the Sales Representative Object 114 lasts for the entire month.

The call to the Sales Rep Factory 115 to create a Sales Representative Object 114 may be coded using the CORBA Interface Definition Language (IDL) as follows:

```
interface BV_SalesRep Fac {
...
BV_SalesRep create_srep (
in BVParticipant part,
in BV_IncentiveDistributorList dl,
);
};
```

Here, a function create_srep of type BV_SalesRep receives two inputs: part, of type BV_Participant (and identifying Participant Program Object 112); and dl, of type BV_IncentiveDistributorList describing a list of Distributor Program Objects 118.

The first input, part is information on the customer's household transmitted from Participant Subsystem 164 to Sales Representative Object 114. The second input, dl, is a list of all currently available Incentive Distributors associated with the store.

Following initialization of Sales Representative Program Object 114, the Sales Representative Factory 115 passes a pointer to the Participant Program Object 112 to the Sales Representative Object 114. The pointer is a data area that indicates where its corresponding program object can be found. Thus communications between the Participant Object 112 and the Sales Representative Program Object 114 can be established.

In a simple nondistributed implementation, the pointer may simply be an address of the location in the computer's storage at which the program object to which the pointer corresponds may be found.

In more complex implementations, such as an implementation capable of being distributed across multiple computer platforms, the pointer may be an object handle in the form of a token that can serve as input to an object request broker such as a CORBA-compliant ORB. Based upon the contents of a particular object handle, the ORB can then direct a request to use the services of a particular program object to that program object.

(b) Transaction Processing

Once the Sales Representative Object 114 is instantiated the customer may select item for purchase. FIG. 7 depicts the process by which a customer does so. User Interface 13 presents the customer 12 with descriptions of items for potential purchase using any means capable of being employed by the User Interface 13. For example, a full-screen interactive system such as an online service or a WWW session may employ icons associated with various products and services, whereas an interactive cable television service may employ a product list that can be scrolled and from which items may be selected using buttons on a remote control device.

When the customer 12 selects items for purchase, User Interface 13 calls Sales Representative Program Object 114 to inform that program object of the selected item. Sales Representative Program Object 114 maintains a Purchase List 170. In response to requests from User Interface 13 to select an item, Sales Representative Program Object 114 validates the selected item against Product Database 116 and adds the selected item to the Purchase List 170.

This is done using a call that interrogates the Product Database 116 for Product Data consisting of an item description and its list price at the time of selection.

The selection of an item for purchase is not a commitment to purchase. It is analogous to a shopper placing an item in a shopping cart in preparation for a purchase. Just as a shopper may elect not to purchase a selected item, User Interface 13 may also communicate to Sales Representative Program Object 114 that the customer does not wish to purchase an item that has previously been selected. In response to such a call, Sales Representative Program Object 114 removes the corresponding entry from Purchase List 170.

Sales Representative Program Object 114 validates all applicable coupons against the store's Redemption Database 172 (which is part of Incentive Subsystem 160) and obtains the pricing rules for the incentive programs that those coupons represent. The Redemption Database 172 accomplishes this by referencing the incentive programs recorded in the Redemption Database 172 and referencing the pricing rules from the corresponding Incentive Program Objects. Optionally, during the course of selecting items for purchase, Sales Representative Program Object 114 may call Pricing Engine 120 to determine the total cost of the items currently selected and placed on Purchase List 170. Sales Representative Program Object 114 passes the purchase list and any applicable pricing rules to Pricing Engine 120. Pricing Engine 120 obtains additional item attributes from Product Database 116 and calculates the proposed total cost of the selected items with discounts from applicable incentives via the pricing rules.

This total cost information is returned to Sales Representative Program Object 114. Sales Representative Program Object 114 provides this information to User Interface 13, which displays it to the customer for approval or for further item selection and/or deselection. This price calculation may be performed, for example, after every selection/deselection operation initiated by the customer, or in response to the customer's specific request to generate a current total. Thereafter, the transaction can be completed.

(c) Transaction Completion

FIGS. 8, 8A and 8B depict the completion of an online transaction in the commerce system. Transaction completion is performed by Sales Representative Program Object 114 in conjunction with Payment Handler Interface 124, as shown in FIG. 8. FIG. 8A depicts the steps performed by the Sales Representative Program Object 114 and FIG. 8B depicts the steps performed by Payment Handler Interface 124 in conjunction with Participant Program Object 112. FIGS. 8A and 8B and should be referenced in conjunction with FIG. 8.

(i) Obtaining Payment Alternatives

In Step 180, Sales Representative Program Object 114 calls Participant Program Object 112 to obtain a list of methods of payment that are available to the customer. In response to the call, Participant Program Object 112 passes to Sales Representative Program Object 114 a list of all payment methods that the customer is authorized to use.

The call may be implemented with the following code:

```
void prepare_to_buy (
    out BV_PaymentMonitor::PaymentList alias_list,
    out BV_Security::UserChallenge challenge)
raises (BV_InvalidState);
```

Parameters alias_list and challenge are outputs from the function.

For each payment method, the Participant Program Object 112 provides the Sales Representative Program Object 114 with a short token used to describe the payment method and a challenge that will be used to validate attempts to use the payment method. The token is a text string that identifies the payment method using words that are familiar to the customer, but does not contain any confidential information. For example, if a customer is authorized for a payment method using the Visa credit card account held in the name of the mother of the household, the token might contain the string "Mom's Visa."

(ii) Selection of Payment Method

In response to output from the function call given directly above, and as shown in Step 181, Sales Representative Program Object 114 calls User Interface 13 to obtain the customer's selected method of payment. As shown in detail in FIG. 8A, in step 181 Sales Representative Program Object 114 calls User Interface 13, passing to it the list of payment method tokens that correspond to the payment methods for which the customer is authorized. User Interface 13 presents the list to the customer, for selection of a preferred payment method and the provision of a password necessary to authenticate his or her use of the payment method. The information presented to the customer 12 is described below in greater detail with reference to FIG. 9. User Interface 13 computes a payment authorization token, called the Response to Challenge, and provides it to Sales Representative Program Object 114. The Response to Challenge is an encrypted token based upon the password entered by the user.

(iii) Input Validation

Also in response to output from the function call above, the payment method selected and the password entered by the customer 12 will be validated. In step 182, Sales Representative Program Object 114 receives the method of payment selection and the payment authorization token from User Interface 13. In step 183, Sales Representative Program Object 114 calls Payment Handler Interface 124 to validate the selected method of payment, passing to the Payment Handler Interface 124 the data received from the customer in step 182.

FIG. 8B depicts step 183 in detail as performed by Payment Handler Interface 124 and Participant Program Object 112. In step 183A, Payment Handler Interface 124 obtains the Response to Challenge token that was supplied in step 182. Typically, this will be passed by the Sales Representative Program Object 114 in the call to Payment Handler Interface 124 in step 183. Payment Handler Interface 124 calls Participant Program Object 112, passing to it the Response to Challenge token. Participant Program Object 112 then calculates, in Step 183C, a reference payment authorization token. The reference payment authorization token is an encrypted token based upon the password taken from the Participant Program Object 112. In step 183D, Participant Program Object 112 compares the Response to Challenge token received from User Interface 13 and the reference payment authorization token, to validate the authority of the customer to use the selected payment method. If the two tokens are equal, Participant Program Object 112 provides to the Payment Handler Interface 124 the information needed to effect an authorization to charge the selected payment method; generally this will include an account number, expiration date, cardholder name, and the like.

In Step 183F, Payment Handler Interface 124 verifies that the Participant Program Object has successfully verified the Response to Challenge. If so, in Step 183H, the Payment Handler Interface 124 calls External Payment Handler 126 to obtain an authorization to charge. External Payment Handler 126 is typically a computer system operated by the institution supporting the payment method. For example, if the customer selects a Visa credit card as a payment method, then Payment Handler Interface 124 will call the VISAnet system for authorization to charge the selected Visa account. External Payment Handler 126 notifies Payment Handler Interface 124 that the charge to the selected payment method will be accepted.

If the tokens are not equal, Payment Handler Interface 124 in step 183G sets an indicator that the selected payment method was not properly authorized. Following either step 183G or 183H, Payment Handler Interface 124 in step 183I returns control to Sales Representative Program Object 114. Typically, in this step Payment Handler Interface 124 may indicate success by supplying to Sales Representative Program Object 114 an Authorization Object that describes the authorization to charge.

In step 184, Sales Representative Program Object 184 checks whether Payment Handler indicated that the selected payment method was not properly authorized. If it was not authorized, Sales Representative Program Object 114 returns to step 181 to again prompt the customer to reenter the method-of-payment data, or optionally aborts the transaction.

One benefit of this method is that it avoids the transmission of sensitive information such as credit card account numbers to Sales Representative Program Object 114. No account numbers are transmitted between User Interface 113 and Sales Representative Program Object 114.

(iv) Order Fulfillment

Once authorization to charge been effected, and as shown by Step 185, Sales Representative Program Object 114 calls the Order Fulfillment Subsystem 128, providing it with the list of items ordered by the customer. Order Fulfillment Subsystem 128 typically calls an existing Order Fulfillment Legacy System 130 to generate shipping manifests and perform other activities needed to ship the selected products to the customer.

(v) Generating Receipt

Following step 185, Sales Representative Program Object 114 creates a receipt 192 and passes it to Participant Program Object 112 for storage to be used if later verification of the order is required.

Typically, the step of creating the Receipt 192 may be accomplished by the steps shown in FIG. 8A. In step 186, Sales Representative Program Object 114 replicates Purchase List 170. In Step 187, Sales Representative Program Object 114 then modifies the replicated Purchase List 170, to indicate that the resulting data structure is a receipt, e.g., by setting a flag. In Step 188, Sales Representative Program Object 114 calls Participant Program Object 112, passing it the newly created receipt 192 for storage.

(vi) Settlement

When the selected products are indicated as shipped, Order Fulfillment Subsystem 128 calls Payment Handler Interface 124 to request the payment that previously authorized in step 183D. Payment Handler Interface 124 again calls External Payment Handler 126 to convert the authorization to charge to a payment order.

(vii) Implementation of Sections (iii) to (vi)

The components of the transaction described above under Sections (iii) to (vi) are completed by the following calls which are described in detail below.

Once the customer 12 has selected a choice of payment type, the Sales Representative Object 114 then calls a buying function of the form:

```
BV_Receipt buy (
    in BV_PaymentMonitor::PaymentAlias payment_type,
    in BV_PaymentMonitor::UserName user,
    in BV_Security::UserResponse response,
    in BV_Boolean external_payment_method,
    in BV PaymentMethod epm
)
```

-continued

```
raises (
    BV_CreditAuth,
    BV_ShippingCalc,
    BV_PricingCalc,
    BV_Redemption,
    BV_Fulfillment,
    BV_Abort,
    BV_InvalidState
);.
```

This call performs a number of steps including:

(i) creating an invoice listing the items to be bought and the shipping destination, (ii) calling the Pricing Engine 120 to calculate a subtotal, (iii) calling the Order Fulfillment Subsystem 130, (iv) calling the Tax Engine 122, (v) computing the total price for the order, (vi) authorizing payment for the order, (vii) fulfilling the order, (viii) redeeming coupons, (ix) returning unused coupons to the customer, and (x) creating a receipt for the customer.

These steps are discussed in turn, below.

The first step is a call to the Pricing Engine 120 to compute a subtotal for the items in the customer's order. The Sales Representative Object 114 passes the customer's order and all the currently existing Pricing Rules to the Pricing Engine 120, which returns a Total List Price, a Total Discount and an itemized price list.

The actual interface to the Pricing Engine 120 takes the form:

```
BV_AmendmentList eval(
    in BV_ItemList target_items,
    in BV_ItemList basket_items,
    in BV_IncentiveList incentives;
    out BV_Money total_list_price,
    out BV_Money total_discount
);
```

The first two inputs, target_items and basket_items, together comprise the Customer's order. Target items are those items that are discountable. Basket_items are those items that are nondiscountable, but which may be required to support discounting (e.g., they may contribute to meeting a quantity requirement).

The third input, incentives, is a list of all currently existing store incentives. Each Incentive takes the form:

```
struct BV_Incentive (
    long application_count;
    boolean valid_with_others;
    BV_PricingRule rule;
);
``` where application_count is the number of times the discount may be applied;

valid_with_others is TRUE if the coupon can be applied to items already subject to a pricing change and FALSE otherwise; and rule is the pricing rule defined by the Store Management via the Store Management Dashboard 20 (as discussed below).

The comparison of items to predicates (described in detail below with reference to FIG. 11) uses a pricing algorithm as follows:

```
Set the total_list_price to $0.00
Set the total_discount to $0.00
For each item in target_items:
    Add the item's list price to the total_list_price
    If the item is no longer discountable, continue to next item
    Por each incentive:
        If the rule matches and yields an adjustment, then Store the <item, incentive, rule, adjustment>
        quartet in an array of results
            Mark item no longer discountable if the incentive is not valid with other offers
            If the adjustment is an amount, modify the total_discount accordingly
        End if
    End this incentive; process next incentive in sequence
Return the array of results to the Sales Rep.
```

After computing the total_list_price and total_discount, the Sales Representative Object 114 invokes a subtotal function to calculate the subtotal=total_list_price−total_discount. The Sales Representative Object 114 then invokes a shipping_cost function to pass the order to an external Shipping Subsystem that calculates shipping costs. This is typically one of several existing legacy systems which interface to the electronic store through the electronic mall's Shipping API. Similarly, the Sales Representative Object 114 calls an external Tax Subsystem to calculate the taxes. Sales Representative Object 114 then adds the subtotal, shipping, and tax to give a total price.

The next step is to authorize payment, as described above in detail. After the sale is authorized, any coupons 119 that were actually used can be redeemed (as will be described below). Any unused coupons 119 are released back to the Sales Representative Object 114 to be returned to the Participant Program Object 112 within Participant Subsystem 164. Such coupons will be available for use by the customer in subsequent shopping sessions.

(viii) User Interface for Payment Selection

FIG. 9 depicts one example of a User Interface 13 to select the preferred payment method as required by the system to the complete the transaction along the lines described above.

In the example, User Interface 13 displays a screen image 113. The screen image includes a display of payment options 212. The customer 12 (not shown) is presented with three payment options: 1) "Mom's Visa"; 2) "Jim's AMEX"; 3) "Debit Jim's Checking Account." User Interface 13 also provides a means for the customer to indicate his or her selection of payment methods. This means is depicted as selection input area 214. The customer may, for example, type the number corresponding to the selected method of payment in this position.

In addition, User Interface 13 provides a means for the customer to supply a password to authenticate his or her identity and authority to use the selected payment method. In the example, this means is depicted as password entry area 216. The customer may enter a password at that location on the screen. User Interface 13 then computes a payment authorization token using the password, and transmits the method of payment selection and the payment authorization token to Sales Representative Program Object 114.

V. Storefront Setup Overview

Each electronic store (represented by storefront 14) has a Store Management associated with it. The Store Management interacts with the electronic store through a Store Management Dashboard 20, which is typically a graphical user interface running at a store manager's local personal computer. These interactions include interactions with 1) the Incentive Subsystem 160 to create discount programs, 2) the Order Fulfillment subsystem to configure or monitor the ordering process, 3) the Observations Subsystem 168 to monitor store sales data, and 4) the Participant Subsystem 164 (owned by service provider) and Customer Account Subsystem 117 (owned by store) to collect customer usage data. Of these, Item 1, incentive creation, which relates mostly to pre-sales activity, is discussed here.

Creating Incentives

In overview, and as shown in FIG. 10, the Store Management uses Store Management Dashboard 20 to interface with the Incentives Subsystem 160 to create Incentive Programs 250.

Information specified in creating an Incentive Program 250 would include the name and description of the incentive, its starting and ending dates, its sponsor, and the price discount. Incentive Programs 250 are created independently of actual shopping sessions, although they may also be created while customers are shopping in the store.

Incentive Programs 250 might include: in-store (public) price discounts, coupon-based price discounts, point-based frequent buyer discounts, or quantity discount cards.

The function of these incentive programs 250 invention will first be described with reference to FIGS. 11 to 13 and in the context of in-store price discounts, which are the most common type of incentive. Thereafter the coupon-based price incentive will be discussed as an extension to the general framework established by the discussion of in-store price discounts. Frequent buyer discounts and quantity discount cards are discussed.

(i) In-Store Price Discounts

In-store price discounts are those where a customer need not present a coupon to obtain the price discount, and which is contingent only upon the customer being in the store while the incentive program is being offered. These are analogous to publicly advertised weekly sales in a physical store.

Although in-store sales are couponless from the customer's perspective, it will be convenient, from the architecture's perspective, to think of in-store price discounts as resulting from coupons that are distributed to the customer upon entering the store. That is, the customer need not bring coupons, but is automatically entitled to the appropriate coupons for any in-store sales. The coupon is used to inform the customer of all in-store price discounts in effect on entering the electronic store—analogous to handing a sales flyer to a customer entering a physical store. This will be explained in detail in the discussion of an actual shopping session below. The concept of a coupon for in-store price discounts is also useful because it establishes an incentive framework that can be used for true coupon-based price discounts (where the customer must present a coupon to receive the price discount), discussed below.

In-store price discounts are embodied in Incentive Programs 250 created by an Incentives Subsystem 160, as shown in FIG. 10. Each Incentive is expressed in a Pricing Rule of the form:

```
struct BV_PricingRule (
    long application_count;
    boolean valid_with_others;
    BV_AdjustmentAndPredicate rule;
);
``` where application_count is the number of times the discount may be applied; valid_with_others is TRUE if the incentive can be applied to items already subject to a pricing change and FALSE otherwise; and rule contains the Adjustment and Predicates associated with the incentive:

```
struct BV_AdjustmentandPredicate (
    BV_Adjustment adjustment;
    BV_PredicateList predicates;
);
```

Each Pricing Rule is embodied in a Pricing Rule Structure 260, illustrated in FIG. 11. Pricing Rule Structure 260 typically comprises three data segments. These are an Adjustment Segment 262, a Predicate Segment 264, and a Qualifier Segment 266. Each Pricing Rule Structure 260 includes one Adjustment Segment 262 and at least one of a Predicate Segment 264 and/or a Qualifier Segment 266. Each is discussed in detail below:

(a) Adjustment Segments

An Adjustment Segment 262 describes how the price of an item is affected if all Predicates Segments 264 (described below) are matched. The Adjustment 262 may be either a simple adjustment or a quantity adjustment. A simple adjustment may either be fixed (e.g., sale price is $10), absolute (e.g., $10 off), or percentage (e.g., 10% off). A quantity adjustment includes the price-based discounting of a simple adjustment but also allows for quantity-based discounting. It takes the form:

```
struct BV_QuantityAdjustment (
    unsigned short required;
    unsigned short discounted;
    BV_SimpleAdjustment adjustment;
    boolean less_or_equal;
);
``` where required is the minimum purchase requirement, discounted is the number of items discounted by this rule, adjustment is the simple adjustment, and less_or_equal= TRUE if the discounted items must be less or equal in value to the items making up the minimum purchase requirement.

Thus, Adjustment Segment 262 contains at least two fields, which respectively indicate the type and amount of adjustment to be made to a price of an item. An Adjustment 262 may be of a type None, Fixed, Absolute, or Percentage. The use of the amount field is dependent on the value of the type field. If Adjustment 262 is of type "None," no adjustment will be made to the price of an item at time of purchase: the item will be sold at the price indicated in Product Database 116.

If Adjustment 262 is of type "Fixed," the amount field contains a value to be substituted for the price indicated in Product Database 116. For example, if the amount field contains "20," the price of the item will be $20, regardless of the value in Product Database 116.

If Adjustment 262 is of type "Absolute," the amount field contains a value to be deducted from the price indicated in Product Database 116. For example, if the amount field contains "20," $20 will be deducted from the value indicated in Pricing Database 116.

If Adjustment 262 is of type "Percentage," the amount field contains a value, expressed as a percentage, that is to be deducted from the price indicated in Product Database 116. For example, if the amount field contains "20," then the value indicated in Pricing Database 116 will be reduced by 20 percent.

(b) Predicate Segments

A Predicate Segment 264 is a specified condition an item must meet to qualify for the adjustment.

Predicate Segment 264 also contains at least two fields, respectively a type field that indicates the type of test that is used to determine whether the pricing rule may be applied to a given item at a given time, and a conditions field that the conditions that must be satisfied in order for the pricing rule to be applied.

If Predicate 264 is of type "Time of Day," the conditions field contains two values, which indicate the beginning time of day and the end time of day that delimit a period of time on which the pricing rule may be applied. For example, if the conditions field contains the two values corresponding to times of day "17:00:00" and "21:00:00," the pricing rule will be applied only between 5:00 P.M. and 9:00 P.M.

If Predicate 264 is of type "Date," the conditions field contains two values, which indicate the beginning and end dates on which the pricing rule may be applied. For example, if the conditions field contains the two values corresponding to the dates "Jul. 1, 1996" and "Jul. 31, 1996," then the pricing rule will be applied only during the month of July 1996.

If Predicate 264 is of type "Day," the conditions field includes a seven-entry boolean array, each entry of which corresponds to a particular day of the week. A "1" value in an entry indicates that the pricing rule may be applied on the day to which the entry corresponds; a "0" value indicates that the pricing rule is not to be applied on that day. For example, if the conditions field contains the value "0000011," then the pricing rule will be applied only on Saturdays and Sundays.

If Predicate 264 is of type "Item Identifier," the conditions field contains a list containing one or more values that identify one or more items to which the pricing rule may be applied. For example, if the conditions field contains the value "XCD-100-56," the pricing rule will be applied only to purchases of the item identified in Product Database 116 as "XCD-100-56."

If Predicate 264 is of type "Item Attribute," the conditions field contains a list containing one or more values that identify an attribute of one or more items to which the pricing rule may be applied. For example, if the conditions field contains the value "blouse," then the pricing rule will be applied to all items identified in Product Database 116 as having the attribute "blouse."

If Predicate 264 is of type "Price," the conditions field contains a comparator indicator having a value such as "greater than," "less than," etc., and a comparison value to be compared to the item's price. For example, if the conditions field contains a comparator value of "greater than" and a comparison value of "10," the pricing rule will be applied to all items identified in the Product Database 116 as having a price greater than $10.

(c) Qualifier Segments

Qualifier Segment 266 is used to identify additional discounts that may be applied other than on an item-by-item basis. For example, a Qualifier Segment 266 may be used to indicate that the pricing rule is to be applied only if 5 or more items are purchased, if the transaction is for over $100 worth of items, or to indicate that one product may be obtained at no charge with the purchase of a particular second product.

(ii) Coupon-Based Price Discounts

In contrast to the Price discounts described above, coupon-based price discounts are those where a customer must present a coupon in order to obtain a specified price discount in a present shopping session. Coupons may come from previous shopping sessions in the coupon-accepting store (intra-store marketing), or from previous shopping sessions in other stores or from a manufacturer supplying many stores (inter-store marketing).

The same incentive creation mechanism discussed above for in-store price discounts is used to create coupon-based price discounts, which may be treated as a superset of in-store price discounts. The primary difference is that the fields for total numbers of coupons and starting serial number are now significant, for they are tools by which store management can limit coupon offerings and track coupon redemptions.

Specifically, coupons other than in-store sale coupons are persistently retained in Participant Program Object 112 from session to session, rather than being available only in the particular session and storefront in which the coupons were distributed. A coupon contains the same information as in-store sale coupons as depicted, namely, the applicable Adjustment Segments 262, Predicate Segments 264, and Qualifier Segments 266. In addition, such coupons also contain a serial number and a digital signature. The serial number is an arbitrarily-sized numeric field that is unique for every coupon distributed by a Distributor Object, within a range as specified at the time the Incentive Program that produced the coupon was created. When a coupon is redeemed, an entry for that coupon is made in Redemption Database 172, indicating that the specific coupon with the specific serial number has been redeemed. A coupon with a given serial number will only be redeemed if the Redemption Database does not contain an indicator that the coupon has already been redeemed. This prevents a coupon from being copied and used by more than one customer, and from being reused by the same customer more than one time.

To maintain the integrity of the coupon's contents, the coupon also contains a digital signature. The digital signature is a field whose content is the result of a cryptographic operation using, for example, the public key encryption method of RSA Data Security, Inc.. The cryptographic operation operates on the contents of the remainder of the coupon, using a key to yield a digital signature, which is stored in the coupon. With the digital signature, any modification of the coupon will fail the redemption process when the digital signature is compared to the remainder of the coupon. This prevents, for example, a customer from altering a discount field to obtain a discount that is greater than that offered by the storefront. It also prevents a customer from making a copy of a coupon and changing its serial number so that it can be used in addition to the original coupon.

Dashboard Operation

As indicated above, Store Management interacts with the system through a Dashboard 20, typically hardware with an associated display screen. Associated with Dashboard 20 and as shown in FIG. 12, is a Dashboard Client 280, in the form of software. As illustrated in FIGS. 12A and 12B the Dashboard Client 280 causes certain information to be displayed on the screen of the Dashboard 20. In order to better understand the operation of the Dashboard Client, these three Figures should be referenced together.

FIG. 12A depicts one view presented by the Dashboard Client to storefront management. Specifically, FIG. 12A depicts a storefront manager establishing an Adjustment 262 of type "Percentage," indicating a 20% discount. Dashboard Client 280 displays a Pricing Term Details Window 282. Pricing Term Details Window 282 includes a set of buttons 284 that are used to select the type of Adjustment 262 being defined, and a set of input areas 286 that are used to specify the amount of discount to be applied.

FIG. 12B depicts a second view presented by the Dashboard Client 280 to a storefront manager. Specifically, FIG. 12B depicts a storefront operator establishing a Predicate 264 of type "Date" that is valid from Jul. 1, 1996 until Jul. 31, 1996, and a Predicate 264 of type "Day" that is valid only on Saturday and Sunday. Dashboard Client 280 displays Sales Details Window 288. Sales Details Window 288 includes a set of two input areas 290 to specify the beginning and end dates on which this pricing rule may be applied, and a set of Day-of-the-Week buttons 292 that indicate the days on which the pricing rule may be applied.

Referring now to FIGS. 12, 12A and 12B together, at the control of the storefront manager and responsive to the data input by the storefront manager, Dashboard Client 280 creates Pricing Rule Structure 300. Thereafter, Dashboard Client 280 calls Incentive Factory 302, passing it Pricing Rule Structure 300. Incentive Factory 302 creates Incentive Program Object 160 reflecting the contents of Pricing Rule Structure 300. Dashboard Client 280 then calls Distributor Factory 304, passing it as a parameter Incentive Program Object 160. Distributor Factory 304 creates Distributor Program Object 118. As described before, Distributor Program Object 118 will be made available to Storefronts 14, and will provide Storefronts 14 with Coupons 119 at transaction time.

Dashboard Client 280 then calls Redemption Registry 310, passing to it as a parameter Incentive Program Object 160. Redemption Registry 310 records Incentive Program Object 160 in Redemption Database 170. As will be recalled and as described with reference to FIG. 7, Redemption Database 170 will be used by Sales Representative Program Object 114 to validate any Coupons 119 sought to be applied to a transaction.

FIG. 13 depicts the operation of Pricing Engine 120 in applying Coupons 119. In Step 300, Pricing Engine 120 begins processing the Purchase List 170 and the associated Coupons 119.

In Step 304, Pricing Engine 120 checks whether it has been passed any Coupons 119. If there are no Coupons 119 to be applied, Pricing Engine 120 skips processing of incentives and proceeds to Step 306.

But, should any Coupons 119 apply, and as shown in Step 308, Pricing Engine 120 selects the first of the Coupons 119 for processing. In Step 310, Pricing Engine 120 selects the first of the Predicate Segments 67 in the Coupon selected. In Step 312, Pricing Engine 120 evaluates the selected Predicate Segment 264 to see if it applies to any of the products specified in Purchase List 170. In Step 314, if conditions specified in the Predicate Segment 264 are not met, Pricing Engine 120 skips to Step 316 without applying the incentive. If the conditions specified in the Predicate Segment 264 are met, Pricing Engine 120 in Step 318 checks whether there are further Predicates to be tested. If so, Pricing Engine 120 in Step 320 selects the next Predicate Segment to be tested, and repeats from Step 312.

If all Predicates have been satisfied, in Step 322, Pricing Engine 120 applies the Coupon's Adjustment Segment 262 to the price of the item as obtained from Product Database 116, i.e., by applying a new price for this transaction (for an Adjustment of type "Fixed"), by reducing the price by the dollar amount indicated (for an Adjustment of type "Absolute"), or by reducing the price by the percentage indicated (for an Adjustment of type "Percentage").

In Step 316, Pricing Engine 120 checks whether there are further Coupons 119 to be processed. If more Coupons 119 remain to be processed, Pricing Engine 120 in Step 324 selects the next Coupon to be processed and returns to Step 310 to begin processing of the newly selected Coupon. If the last Incentive Program Object has been processed, Pricing Engine 120 proceeds to Step 326. In Step 326, Pricing Engine 120 computes the total cost of the transaction, with all Coupons 119 applied to Purchase List 170. In Step 328, Pricing Engine 120 returns control to Sales Representative Program Object 114.

Observation Subsystem

The Observations Subsystem 168 (FIG. 5) provides a system for recording events that represent observable data that results from customer interactions. FIGS. 14 and 15 depict the Observation Subsystem 168. Observation Subsystem 168 comprises two types of program object. These are called collectors and event recipients. FIGS. 14 and 15 depict three collectors 340, 342 and 344 and four event recipients 350, 352, 354 and 356. A program object called a "collector" communicates events to one or more event recipients that have registered with the collector. Event Recipients are of two types, either Active Monitors or Loggers.

Active Monitors perform real-time analysis of observations. Each Active Monitor analyses certain types of data to produce a result that can be displayed to a store operator via the Dashboard. An example is an Active Monitor for monitoring sales volume. Such an Active Monitor could receive events that describe orders purchased, and calculate a periodic total of items being purchased. The result would be a tracking of volume of orders on a periodic basis, e.g., hourly, which could be presented as a graphical display on the Dashboard.

Loggers receive observations and write them to an external file in a predefined format, to produce a log of events that can be subsequently processed for historical analysis. For example, the log could be processed to determine if there is a trend signifying an increase over time of purchase of selected items. Also, purchases over time may be correlated with specific attributes of customers, e.g., income level or neighborhood. The resulting information could be provided to the Promotions Subsystem 116 to direct particular promotions to customers having similar attributes.

FIG. 14 depicts the process of registration with a collector. An Event Recipient such as Event Recipient 350 locates a Collector such as Collector 340 by means of a nameserver such as that specified by the CORBA Object Request Broker specification. Event Recipient 350 makes a call 360 to Collector 340, requesting to be registered with Collector 340. FIG. 14 depicts Event Recipient 350 registering with Collector 340; Event Recipient 352 registering with Collectors 340 and 342; Event 354 registering with Collector 344; and Event Recipient 356 registering with Collector 342. As can be seen in FIG. 14, an Event Recipient may be registered with more than one Collector, and a Collector may register more than one Event Recipient.

FIG. 15 depicts the process of communicating Events 361 from Collectors 340, 342, and 344 to Event Recipients 350, 352, 354 and 356. Each Collector communicates events only to the Event Recipients that have registered with it.

Events that are transmitted by a collector may include events tracking general system navigation events, shopping events, purchasing events, and user-defined events.

General system navigation events may include, for example: Start-Session, End_Session, Generic_Profile, Enter_Service, Exit_Service, Enter_Category, Exit_Category, Enter_Location and Exit_Location.

The Start_Session event defines when a customer begins a particular commerce session. This may be, for example, when the customer logs on to Compuserve, America Online, etc. This event includes the following data: session_id, an unique identifier identifying the session; session_connection, which identifies how the customer is connected to the session; and date_time, a date/time stamp. The End_Session event defines when a customer exits a particular session. This event includes the date: session_id and date_time.

The Generic_Profile event is optionally generated at session start time to provide the Observation Subsystem with information regarding the customer. This event includes the following data: income_level; gender; age; and geographic location.

The Enter_Service event is generated when a customer begins using a particular storefront. This event includes the following data: session_id; service_id, which identifies the particular storefront in use by the customer; and date_time. A corresponding Exit_Service event is generated when the customer leaves the storefront, and includes session_id; service_id, and date_time.

The Enter_Category event is generated when a customer selects a particular category of items to review within a storefront. It includes the following data: session_id; service_id; date_time; and category_id, which identifies the particular category being selected by the customer. A corresponding Exit_Category event is generated when the customer exits the category and includes session_id; service_id; date_time; and category_id.

The Enter_Location event is generated to identify physical location information about items being reviewed by a customer, for example, a particular spot on a printed catalog being reviewed by a customer. It includes the following data: session_id; service_id; date_time; and location_id, which may, for example, identify the cartesian coordinates within a particular catalog page being reviewed by the customer. A corresponding Exit_Location is generated when the customer stops reviewing the physical location and includes the following data: session_id; service_id; date_time; and location_id.

Shopping events may include, for example: Select_Item, Unselect_Item and View_Item.

The Select_Item event is generated when a customer selects an item as a purchase candidate, akin to when a customer in a real store places an item in a shopping cart. The Select_Item event includes the following data: session_id; service_id; date_time; and product_id, which identifies the selected product.

The Unselect_Item event is generated when a customer decides not to purchase a particular item and unselects the item as a purchase candidate, akin to removing it from the shopping cart and replacing it on the store shelf. The Unselect_Item event includes the following data: session_id; service_id; date_time; and product_id.

The View_Item event is generated when a customer requests derailed information about an item being offered by a storefront. The View_Item event includes the following data: session_id; service_id; date_time; and product_id.

Purchasing events may include, for example: Purchase_Item and Purchase_Order.

The Purchase_Item event is generated when a customer actually purchases a selected item. When a purchase request is made, one Purchase_Item event is generated for each item purchased. The Purchase_Item event includes the following data: session_id; service_id; date_time; product_id; retail_price; discount_price; and incentive_name, which identifies any incentive that was applied to the price.

The Purchase_Order even is generated when a customer actually makes a purchase of one or more items. When a purchase request is made, one Purchase_Order event is generated for the entire order, regardless of the number of items in the order. The Purchase_Order event includes the following data: session_id; service_id; date_time; number_of_items_purchased; total_price; and total_discount.

A User-Defined Event is a general-purpose event that may be generated for any event that is of interest to the operator of the commerce system. The User_Defined event includes the following data: session_id; service_id; date_time; user_defined_type, which is a user-defined field that identifies the type of user-defined event being observed; and data_string, a string of data formatted according to the needs of the developer.

VII Additional Features
Variations on Above Disclosed Embodiment
a. Long-Lived Sales Representative In the previously described embodiment of the invention, the Customer Monitoring Object/Sales Representative Program Object 114 was created and terminated after each shopping trip. In another embodiment of the invention, a Sales Representative Program Object 114 may be longer-lived. Typically, Sales Representative Program Object termination is associated with customer billing. For example, if the Electronic Storefront uses monthly rather than session billing, the Sales Representative Program Object 114 would be terminated at the end of the monthly shopping cycle rather than at the end of each shopping trip.

In cases where a customer's Sales Representative Program Object outlives the shopping trip during which the Sales Representative Program Object was created, termination of a shopping trip causes the Sales Representative Program Object to become "dormant." Typically, this is effected by causing information regarding that shopping trip to be stored and, for example, flags/pointers to be set so that the Sales Representative Program Object can be "revived" or recalled at a later date. Subsequent shopping Rips can then be initiated by recalling the particular Sales Representative Program Object assigned to that customer. Thereafter, the transaction would proceed as in the earlier-described embodiment, except that the Sales Representative Program Object would only be terminated at the end of the shopping trip if customer billing was performed.

b. Sales Representative Program Object for Multiple Stores

Similarly, the above description focuses on a Sales Representative Program Object associated with a single supplier of items such as a store. It is, however, possible that a Sales Representaive Program Object can be created to "attend" to a customer interacting with a number of suppliers. In this embodiment, the Sales Representative Program Object can maintain a list of all items selected by the customer as well as a reference to the supplier of each item.

c. Frequent Buyer Incentives
i. In-store Frequent Buyer Points

Another type of in-store incentive is a frequent buyer points program. Here, the in-store incentive takes the form of points issued to a customer's frequent buyer account rather than an instantaneous price discount. The customer may redeem points at various levels to obtain actual price discounts.

ii. Coupon-Based Frequent Buyer Points

A coupon-based price frequent buyer program is one in which the customer presents a coupon, typically from a previous shopping session, for frequent buyer points in a present shopping session. The frequent buyer coupon takes the same predicate/adjustment form as the price discount coupon, except that the adjustment takes the form of points issued to a customer's frequent buyer account rather than an instantaneous price discount. The customer may redeem points at various levels to obtain actual price discounts.

c. Quantity Discount Incentives

A third type of incentive program is the quantity discount card. Here, the customer has a quantity discount card which is electronically punched each time the customer makes a qualifying purchase. When a required number of punches have been made, the customer receives a discount, e.g., "Buy 10, Get 1 Free" or $10 off.

CONCLUSION

In summary, the electronic mall is an example of a system architecture in which interface-compliant implementations of these basic functional subsystems may be interconnected in a manner to suit the needs of a particular electronic commerce participant. The invention provides some subsystems directly (in the form of complete Internal Commerce Subsystems), and other subsystems indirectly (in the form of interfaces to External Commerce Subsystems), with each store being able to select the particular combination that best suits its specific needs. However, all subsystems, whether External or Internal, are compatible with a set of standardized subsystem interfaces. At the front end, a customer shops in the electronic store through an Electronic Storefront, and at the back end, the store management interfaces with and controls the various subsystems through a Store Management Dashboard.

The operation of the system described above includes exemplary code for selected interfaces where it is illustrative of the operation of the subsystem. The source code is written using the Common Object Request Broker Architecture (CORBA) Interface Definition Language (IDL).

All publications and existing subsystems mentioned in this specification are herein incorporated by reference to the same extent as if each individual publication or existing subsystems were specifically and individually indicated to be incorporated by reference.

It will be apparent to one of ordinary skill in the art that many changes and modifications can be made thereto without departing from the spirit or a scope of the appended claims.

We claim:

1. A system for facilitating commercial transactions, between a plurality of customers and at least one supplier of items, over a computer driven network capable of providing communications between the supplier and at least one customer site associated with each customer and including an input means and a display, the system comprising:

a. means for causing at least one supplier to be represented on the display for selection by the customer using the input means;

b. means for effecting presentation of items on the display for customer observation;

c. an item database associated with a supplier and including information on presented items;

d. pricing means for receiving information from the item database to determine the cost associated with a presented item;

e. a customer information database for storing information relating to a customer; and f. means for creating a customer monitoring object for each customer by referencing information, relating to that customer, which had been stored in the customer information database and upon the customer selecting at least one supplier such that the customer monitoring object is configured to operate by i. responding to customer enquiries, communicated through the input means, regarding a presented item by accessing the item database to retrieve information relating to said item and to present said information to the customer by means of the display, ii. receiving a customer's selection of a presented item through the input means, iii. communicating with the pricing means to have the cost of the item determined, iv. presenting the cost to the customer by means of the display, v. receiving customer communications, through the input means, indicating a desire to receive the item, and vi. passing a delivery initiation communication to initiate the delivery of the item to the customer.

2. The system of claim 1, further comprising a customer monitoring object configured to operate by:

a. responding to customer enquiries, communicated through the input means, regarding a presented item by accessing the item database to retrieve information relating to said item and to present said information to the customer by means of the display, b. receiving a customer's selection of a presented item through the input means, c. communicating with the pricing means to have the cost of the item determined, d. presenting the cost to the customer by means of the display, e. receiving customer communications, through the input means, indicating a desire to receive the item, f. passing a delivery initiation communication to initiate the delivery of the item to the customer, and g. maintaining a list of selected items and present the customer with a cost of the selected items for approval by the customer before the customer monitoring object passes the delivery initiation communication.

3. The system of claim 2, wherein the customer monitoring object is configured to present the customer with an opportunity to deselect an item whereupon the customer monitoring object communicates with the pricing means to have the costs of the remaining selected items redetermined and presented anew to the customer.

4. The system of claim 2, further comprising order fulfillment initiation means, responsive to the delivery initiation communication from the customer monitoring object, for initiating proceedings to cause the item desired by the customer delivered to the customer.

5. The system of claim 4, wherein the order fulfillment means includes an interface with a shipping facility for facilitating the shipping of the desired item to the customer.

6. The system of claim 2, further comprising a payment handler means for initiating customer payment for the desired item.

7. The system of claim 6, wherein the payment handler means is responsive to communications from the customer monitoring object and receives information from the customer identification database in order to initiate customer payment.

8. The system of claim 7, wherein the customer monitoring object is configured to confirm to the customer that the order for the item has been successfully processed.

9. The system of claim 2, further comprising a payment validation system including means for causing the customer monitoring object to receive the information related to the forms of payment available to the customer and to present the customer with a selection of the forms of payment;

means for receiving a first security code, related to a selected form of payment, from the customer; and means for validating the first security code by comparison to a second security code available to the customer monitoring object;

whereby payment for the item is initiated if the first security code is validated.

10. The system of claim 2, further comprising a cost discount storage for maintaining cost reduction information associated with a supplier's items, wherein the pricing means receives relevant parts of the cost reduction information to calculate the cost of the associated item.

11. The system of claim 10, wherein the customer monitoring object is configured to receive cost reduction information communicate the reduction information to the pricing means.

12. The system of claim 11, wherein the customer monitoring object is configured to confirm to the customer that the order for the item has been successfully processed.

13. The system of claim 12, wherein the supplier control means is configured to receive input, from a supplier at a first time, to define changes to the cost reduction information for a second time later than the first time.

14. The system of claim 11, further comprising supplier control means for receiving input, from a supplier, for changing the cost reduction information.

15. The system of claim 2, further comprising means, responsive to an input from the customer, to terminate the customer's interaction with the supplier whereupon which termination the customer monitoring object ceases to operate.

16. The system of claim 2, further comprising means, responsive to an input from the customer, to terminate the customer's interaction with the supplier whereupon the customer monitoring object ceases to operate and information regarding at least the interaction is stored for retrieval at a subsequent time at which the customer interacts with the supplier whereby the customer monitoring object recommences operation utilizing the stored information.

17. The system of claim 16, wherein the participant program object includes information related to forms of payment available to the customer.

18. The system of claim 2, further comprising means for accessing the customer information database and for creating a participant program object including information specific to the customer retrieved from the information database and in communication with and for passing customer specific information the customer monitoring object.

19. The system of claim 18, wherein the participant program object is created at the time an interaction between the customer and the system commences.

20. The system of claim 2, further comprising an observation subsystem for receiving and maintaining customer interaction information relating to at least one customer's communications over the computer driven network.

21. The system of claim 20, further comprising supplier control means for receiving input, from a supplier, for changing the cost reduction information.

22. The system of claim 21, wherein the supplier control means is configured to receive input, from a supplier at a first time, to define changes to the cost reduction information for a second time later than the first time.

23. The system of claim 22 wherein the supplier control means is in communication with the observation subsystem to receive customer interaction information for display to the supplier.

24. The system of claim 23, wherein the supplier control includes:
   a. an information processor for processing received customer interaction information; and
   b. means for selectively displaying at least a part of the processed customer interaction information to the supplier.

25. The system of claim 2 wherein the means for causing at least one supplier to be represented can cause a plurality of suppliers to be represented, the system further comprising means to enable a customer to select at least one of the represented suppliers.

26. A system for facilitating commercial transactions, between a plurality of customers and at least one supplier of items, over a computer driven network capable of providing communications between the supplier and at least one customer site associated with each customer and including an input means and a display, the system comprising:
   a. means for causing at least one supplier to be represented on the display for selection by the customer using the input means;
   b. means for effecting presentation of items on the display for customer observation;
   c. an item database associated with a supplier and including information on presented items;
   d. pricing means for receiving information from the item database to determine the cost associated with a presented item;
   e. a customer information database for storing information relating to a customer; and
   f. means for creating a customer monitoring object for each customer by referencing information, relating to that customer, which had been stored in the customer information database and upon the customer selecting at least one supplier such that the customer monitoring object is configured to operate by
      i. responding to customer enquiries, communicated through the input means, regarding a presented item by accessing the item database to retrieve information relating to said item and to present said information to the customer by means of the display,
      ii. receiving a customer's selection of a presented item through the input means,
      iii. communicating with the pricing means to have the cost of the item determined,
      iv. presenting the cost to the customer by means of the display,
      v. receiving customer communications, through the input means, indicating a desire to receive the item,
      vi. passing a delivery initiation communication to initiate the delivery of the item to the customer; and
   g. a means for accessing the customer information database and for creating a participant program object including information specific to the customer retrieved from the information database and in communication with and for passing customer specific information to the customer monitoring object.

27. The system of claim 26, further comprising a customer monitoring object configured to operate by:
   a. responding to customer enquiries, communicated through the input means, regarding a presented item by accessing the item database to retrieve information relating to said item and to present said information to the customer by means of the display,
   b. receiving a customer's selection of a presented item through the input means,
   c. communicating with the pricing means to have the cost of the item determined,
   d. presenting the cost to the customer by means of the display,
   e. receiving customer communications, through the input means, indicating a desire to receive the item,
   f. passing a delivery initiation communication to initiate the delivery of the item to the customer, and
   g. maintaining a list of selected items and present the customer with a cost of the selected items for approval by the customer before the customer monitoring object passes the delivery initiation communication.

28. The system of claim 27, wherein the customer monitoring object is configured to present the customer with an opportunity to deselect an item whereupon the customer monitoring object communicates with the pricing means to have the costs of the renaming selected items redetermined and presented anew to the customer.

29. The system of claim 27, further comprising order fulfillment initiation means, responsive to the delivery initiation communication from the customer monitoring object, for initiating proceedings to cause the item desired by the customer delivered to the customer.

30. The system of claim 27, wherein the order fulfillment means includes an interface with a shipping facility for facilitating the shipping of the desired item to the customer.

31. The system of claim 27, further comprising a payment handler means for initiating customer payment for the desired item.

32. The system of claim 31, wherein the payment handler means is responsive to communications from the customer monitoring object and receives information from the customer identification database in order to initiate customer payment.

33. The system of claim 27, further comprising a payment validation system including
   means for causing the customer monitoring object to receive the information related to the forms of payment available to the customer and to present the customer with a selection of the forms of payment;
   means for receiving a first security code, related to a selected form of payment, from the customer; and
   means for validating the first security code by comparison to a second security code available to the customer monitoring object;
   whereby payment for the item is initiated if the first security code is validated.

34. The system of claim 27, further comprising a cost discount storage for maintaining cost reduction information associated with a supplier's items,
   wherein the pricing means receives relevant parts of the cost reduction information to calculate the cost of the associated item.

35. The system of claim 34, wherein the customer monitoring object is configured to receive cost reduction information communicate the reduction information to the pricing means.

36. The system of claim 35, further comprising means for receiving input, from a supplier, for changing the cost reduction information.

37. The system of claim 36, wherein the supplier control means is configured to receive input, from a supplier at a first time, to define changes to the cost reduction information for a second time later than the first time.

38. The system of claim 27, further comprising means, responsive to an input from the customer, to terminate the customer's interaction with the supplier upon which termination the customer monitoring object ceases to operate.

39. The system of claim 27, further comprising means, responsive to an input from the customer, to terminate the customer's interaction with the supplier whereupon the customer monitoring object ceases to operate and information regarding at least the interaction is stored for retrieval at a subsequent time at which the customer interacts with the supplier whereby the customer monitoring object recommences operation utilizing the stored information.

40. The system of claim 27, wherein the participant program object is created at the time an interaction between the customer and the system commences.

41. The system of claim 40, wherein the participant program object includes information related to forms of payment available to the customer.

42. The system of claim 27, further comprising means for causing at least one supplier to be represented on the display and means for receiving an input from the customer indicating a selection of a represented supplier.

43. The system of claim 42, whereby said means for creating a customer monitoring object creates the customer monitoring object for the customer when the customer selects the supplier.

44. The system of claim 27, further comprising an observation subsystem for receiving and maintaining customer interaction information relating to at least one customer's communications over the computer driven network.

45. The system of claim 44, further comprising supplier control means for receiving input, from a supplier, for changing the cost reduction information.

46. The system of claim 45, wherein the supplier control means is configured to receive input, from a supplier at a first time, to define changes to the cost reduction information for a second time later than the first time.

47. The system of claim 46, wherein the supplier control means is in communication with the observation subsystem to receive customer interaction information for display to the supplier.

48. The system of claim 47, wherein the supplier control means includes:

a. an information processor for processing received customer interaction information; and
   b. means for selectively displaying at least a part of the processed customer interaction information to the supplier.

49. The system of claim 26 wherein the means for causing at least one supplier to be represented can cause a plurality of suppliers to be represented, the system further comprising means to enable a customer to select at least one of the represented suppliers.

* * * * *